United States Patent
Arisawa

(10) Patent No.: US 9,476,736 B2
(45) Date of Patent: Oct. 25, 2016

(54) ELECTRIC POWER RECEIVING APPARATUS, METHOD OF CONTROLLING THE SAME, AND ELECTRIC POWER FEEDING SYSTEM INCLUDING THE SAME

(71) Applicant: Sony Corporation, Tokyo (JP)

(72) Inventor: Shigeru Arisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 689 days.

(21) Appl. No.: 13/790,463

(22) Filed: Mar. 8, 2013

(65) Prior Publication Data

US 2013/0264887 A1 Oct. 10, 2013

(30) Foreign Application Priority Data

Apr. 10, 2012 (JP) .................................. 2012-089054

(51) Int. Cl.
*G01D 5/20* (2006.01)
*H01F 38/14* (2006.01)
*H02J 5/00* (2016.01)
*H02J 7/02* (2016.01)

(52) U.S. Cl.
CPC ............ *G01D 5/2006* (2013.01); *H01F 38/14* (2013.01); *H02J 5/005* (2013.01); *H02J 7/025* (2013.01)

(58) Field of Classification Search
CPC ...... G01D 5/2006; H01F 38/14; H02J 5/005; H02J 7/025; H02J 17/00; B60L 11/182

USPC ......................................................... 307/104
See application file for complete search history.

(56) References Cited

U.S. PATENT DOCUMENTS

| | | | | |
|---|---|---|---|---|
| 2007/0216392 A1* | 9/2007 | Stevens | ................... | H02J 5/005 323/355 |
| 2007/0228833 A1* | 10/2007 | Stevens | ................... | H02J 5/005 307/45 |
| 2009/0001932 A1* | 1/2009 | Kamijo | ................... | H02J 5/005 320/108 |
| 2009/0079271 A1* | 3/2009 | Jin | .......................... | H02J 7/025 307/104 |
| 2009/0175060 A1* | 7/2009 | Onishi | .................... | H02J 7/025 363/56.06 |
| 2009/0322281 A1* | 12/2009 | Kamijo | ................... | H02J 5/005 320/108 |
| 2010/0315039 A1* | 12/2010 | Terao | ..................... | H02J 7/025 320/108 |

(Continued)

*Primary Examiner* — Thienvu Tran
*Assistant Examiner* — Brian K Baxter
(74) *Attorney, Agent, or Firm* — Chip Law Group

(57) ABSTRACT

An electric power receiving apparatus including: an electric power receiving coil disposed in a position where a receiving voltage is induced by a magnetic field from an electric power feeding apparatus; a measuring coil disposed in a position where a monitoring induced voltage as a voltage corresponding to the receiving voltage is induced by the magnetic field; and a foreign object detecting portion generating an amount of change in an impedance of the electric power receiving coil from the monitoring induced voltage and an induced current of the electric power receiving coil, thereby detecting a foreign object in the magnetic field based on the amount of change.

15 Claims, 26 Drawing Sheets

(56) References Cited

U.S. PATENT DOCUMENTS

| | | | | |
|---|---|---|---|---|
| 2010/0328044 | A1* | 12/2010 | Waffenschmidt | H02J 7/025 340/10.4 |
| 2011/0196544 | A1* | 8/2011 | Baarman | H01F 38/14 700/291 |
| 2012/0091993 | A1* | 4/2012 | Uramoto | H02J 7/025 324/105 |
| 2012/0146576 | A1* | 6/2012 | Partovi | H01F 7/0252 320/108 |
| 2012/0175967 | A1* | 7/2012 | Dibben | H02J 5/005 307/104 |
| 2012/0181875 | A1* | 7/2012 | Wechlin | B60L 3/00 307/104 |
| 2012/0235636 | A1* | 9/2012 | Partovi | H02J 7/025 320/108 |
| 2012/0313579 | A1* | 12/2012 | Matsumoto | H02J 7/025 320/108 |
| 2013/0063085 | A1* | 3/2013 | Takada | B60L 11/182 320/108 |
| 2013/0076153 | A1* | 3/2013 | Murayama | H02J 7/025 307/104 |
| 2013/0099592 | A1* | 4/2013 | Abe | H02J 5/005 307/104 |
| 2013/0257165 | A1* | 10/2013 | Singh | G01V 3/12 307/98 |

* cited by examiner

ELECTRIC POWER RECEIVING APPARATUS, METHOD OF CONTROLLING THE SAME, AND ELECTRIC POWER FEEDING SYSTEM INCLUDING THE SAME

BACKGROUND

The present disclosure relates to an electric power receiving apparatus, a method of controlling the same, and an electric power feeding system including the same. More particularly, the present disclosure relates to an electric power receiving apparatus in a non-contact type electric power feeding system which electrically feeds an electric power in a non-contact manner, a method of controlling the same, and the non-contact type electric power feeding system including the same.

Heretofore, a circuit for detecting an object which enters a magnetic field generated between an electric power feeding apparatus and an electric power receiving apparatus in the form of a foreign object is provided in a non-contact type electric power feeding system for electrically feeding an electric power in a non-contact manner in some cases. The reason why such a circuit is provided is because when the foreign object composed of an electric conductor enters the magnetic field, an eddy current is generated within the foreign object, and the foreign object generates heat by an influence of the Joule heat due to the eddy current in some cases. When an amount of heat generation of the foreign object is large, it is feared that an apparatus and a chassis in the non-contact type electric power feeding system are damaged. In particular, since in quick charging, the strength of the magnetic field outputted by the electric power feeding apparatus become large, an amount of heat generation of the foreign object becomes large, and thus the presence of the foreign object becomes a problem in many cases.

A circuit for determining presence or absence of a foreign object depending on whether or not amplitude of a voltage induced on an electric power receiving side is smaller than a reference value, for example, is proposed as a circuit for detecting a foreign object. This circuit, for example, is described in Japanese Patent Laid-Open No. 2012-16125. With this circuit, when the foreign object is present, a loss in the electric power is generated due to the eddy current generated in the foreign object and thus an electric power feeding efficiency is reduced. Therefore, the foreign object is determined to be present when the amplitude of the voltage on the electric power receiving side is reduced so as to be smaller than the reference value.

SUMMARY

However, with the related art described above, it may be impossible to precisely detect the presence of the foreign object in some cases. Specifically, the electric power receiving apparatus described above detects the foreign object by mistake when the amplitude of the voltage in an electric power receiving coil is reduced due to the cause other than the entering of the foreign object in some cases. The reduction of the amplitude of the voltage in an electric power receiving coil is caused due to the reduction or the like of the fed electric power or the electric power feeding efficiency owing to the failure, the aging or the like of the electric power feeding apparatus in addition to the entering of the foreign object. However, the electric power receiving apparatus described above acquires none of the amount of fed electric power and the electric power transmitting efficiency. In addition, in the electric power receiving apparatus described above, it is not supposed that the positions of the electric power feeding coil and the electric power receiving coil are shifted from each other. For this reason, when the amplitude of the voltage is reduced in the electric power receiving coil, it may be impossible to determine whether the reduction of the amplitude of the voltage is due to the entering of the foreign object or due to the reduction of the fed electric power or the electric power transmitting efficiency. In addition, when the amplitude of the voltage is reduced in the electric power receiving coil, it may also be impossible to determine whether the reduction of the amplitude of the voltage is due to the mutual shifting of the positions of the electric power feeding coil and the electric power receiving coil, or due to the entering of the foreign object. As a result, when the amplitude of the voltage in the electric power receiving coil is reduced due to the cause other than the entering of the foreign object, the foreign object undergoes the mal-detection in some cases.

The present disclosure has been made in order to solve the problems described above, and it is therefore desirable to provide an electric power receiving apparatus which is capable of precisely detecting a foreign object, a method of controlling the same, and an electric power feeding system including the same.

In order to attain the desire described above, according to an embodiment of the present disclosure, there is provided an electric power receiving apparatus including: an electric power receiving coil disposed in a position where a receiving voltage is induced by a magnetic field from an electric power feeding apparatus; a measuring coil disposed in a position where a monitoring induced voltage as a voltage corresponding to the receiving voltage is induced by the magnetic field; and a foreign object detecting portion generating an amount of change in an impedance of the electric power receiving coil from the monitoring induced voltage and an induced current of the electric power receiving coil, thereby detecting a foreign object in the magnetic field based on the amount of change.

As a result, the electric power receiving apparatus according to the embodiment of the present disclosure offers an operation that the foreign object is detected based on an amount of change in the impedance of the electric power receiving coil.

Preferably, the measuring coil may be disposed in a position where a mutual induced voltage as a voltage induced in the measuring coil by the magnetic field from the electric power receiving coil becomes smaller than a predetermined value. As a result, there is offered an operation that the mutual induced voltage becomes smaller than the predetermined value.

Preferably, the measuring coil may be disposed in a position where the measuring coil straddles a part of the electric power receiving coil. As a result, there is offered an operation that the measuring coil is disposed in the position where the measuring coil straddles the part of the electric power receiving coil.

Preferably, an area of a coil surface of the measuring coil may be smaller than that of the electric power receiving coil, and the measuring coil may be disposed at a center of the electric power receiving coil. As a result, there is offered an operation that the measuring coil is disposed at the center of the electric power receiving coil.

Preferably, the impedance may include at least one of a resistance and a reactance of the electric power receiving coil. As a result, there is offered an operation that at least one of the resistance and the reactance of the electric power receiving coil is included in the impedance.

Preferably, the foreign object detecting portion may determine that the foreign object is present when the amount of change exceeds a predetermined threshold value. As a result, there is offered an operation that when the amount of change exceeds the predetermined threshold value, the foreign object is determined to be present.

Preferably, the impedance may include a resistance of the electric power receiving coil, and the foreign object detecting portion may determine that the foreign object is present when an eddy current loss of the foreign object is generated from an amount of change in the resistance, and the induced current, and exceeds a threshold value. As a result, there is offered an operation that the foreign object is determined to be present when the eddy current loss exceeds the threshold value.

Preferably, the electric power receiving apparatus according to the embodiment of the present disclosure may further include a control signal transmitting circuit transmitting a control signal in accordance with which a power source supplied from the electric power feeding apparatus through the magnetic field is controlled to the electric power feeding apparatus when in the detection of the foreign object, the foreign object is determined to be present. As a result, there is offered an operation that the control signal is transmitted to the electric power feeding apparatus.

Preferably, the foreign object detecting portion may determine an amount of control for the power source based on the amount of change, and the induced current when in the detection of the foreign object, the foreign object is determined to be present; and the control signal transmitting circuit may transmit the control signal in accordance with which the power source is controlled so as to correspond to the amount of control. As a result, there is offered an operation that the control signal in accordance with which the power source is controlled is transmitted so as to correspond to the amount of control.

Preferably, the electric power receiving apparatus according to the embodiment of the present disclosure may further include a charging control circuit controlling a charging current to a load connected to the electric power receiving apparatus based on a result of the detection of the foreign object. As a result, there is offered an operation that the charging current is controlled based on the result of the detection of the foreign object.

Preferably, the electric power receiving apparatus according to the embodiment of the present disclosure may further include a control result transmitting circuit transmitting a result of the control for the charging current to the electric power feeding apparatus. As a result, there is offered an operation that the result of the control for the charging current is transmitted to the electric power feeding apparatus.

Preferably, the electric power receiving apparatus according to the embodiment of the present disclosure may further include a ratio generating portion generating a ratio between the receiving voltage and the monitoring induced voltage, in which the foreign object detecting portion may generate the amount of change based on the ratio thus acquired, the monitoring induced voltage, and the induced current. As a result, there is offered an operation that the ratio between the receiving voltage and the monitoring induced voltage is generated.

Preferably, the foreign object detecting portion may further acquire a resistance of the electric power receiving coil when the foreign object is absent as a secondary resistance, and may generate the amount of change from the secondary resistance, the monitoring induced voltage, and the induced current. As a result, there is offered an operation that the amount of change is generated from the secondary resistance, the monitoring induced voltage, and the induced current.

According to another embodiment of the present disclosure, there is provided a method of controlling an electric power receiving apparatus including: generating an amount of change in an impedance of an electric power receiving coil from a monitoring induced voltage in a measuring coil disposed in a position where the monitoring induced voltage as a voltage corresponding to a receiving voltage is induced by a magnetic field, and an induced current of a receiving coil disposed in a position where the receiving voltage is induced by a magnetic field from an electric power feeding apparatus by a foreign object detecting portion; and detecting a foreign object in the magnetic field based on the amount of change by the foreign object detecting portion.

As a result, the method of controlling an electric power receiving apparatus according to another embodiment of the present disclosure offers an operation that the foreign object is detected based on an amount of change in the impedance of the electric power receiving coil.

According to still another embodiment of the present disclosure, there is provided an electric power feeding system including: an electric power feeding apparatus supplying a power source through a magnetic field; and an electric power receiving apparatus including an electric power receiving coil disposed in a position where a receiving voltage is induced by the magnetic field, a measuring coil disposed in a position where a monitoring induced voltage as a voltage corresponding to the receiving voltage is induced by the magnetic field, and a foreign object detecting portion generating an amount of change in an impedance of the electric power receiving coil from the monitoring induced voltage and an induced current of the electric power receiving coil, thereby detecting a foreign object in the magnetic field based on the amount of change.

As a result, the electric power feeding system according to still another embodiment of the present disclosure offers an operation that the foreign object is detected based on the amount of change in the impedance.

As set forth hereinabove, according to the present disclosure, it is possible to offer a superior effect that the electric power receiving apparatus can precisely detect the foreign object.

DETAILED DESCRIPTION OF THE PREFERRED EMBODIMENTS

Embodiments of the present disclosure will be described in detail hereinafter with reference to the accompanying drawings. It is noted that the description will be given below in accordance with the following order.

1. First Embodiment (the case where a foreign object is detected based on amounts of changes in a resistance and an inductance of an electric power receiving coil)

2. Second Embodiment (the case where a foreign object is detected based on an amount of change in the resistance of the electric power receiving coil)

3. Third Embodiment (the case where detection of a foreign object and calculation of an amount of control are carried out based on the amount of change in the resistance of the electric power receiving coil)

4. Fourth Embodiment (the case where a ratio of an electromotive force is obtained)

5. Fifth Embodiment (the case where a foreign object is detected by changing a load resistance)

1. First Embodiment

[Configuration of Non-Contact Type Electric Power Feeding System]

Figure 1:
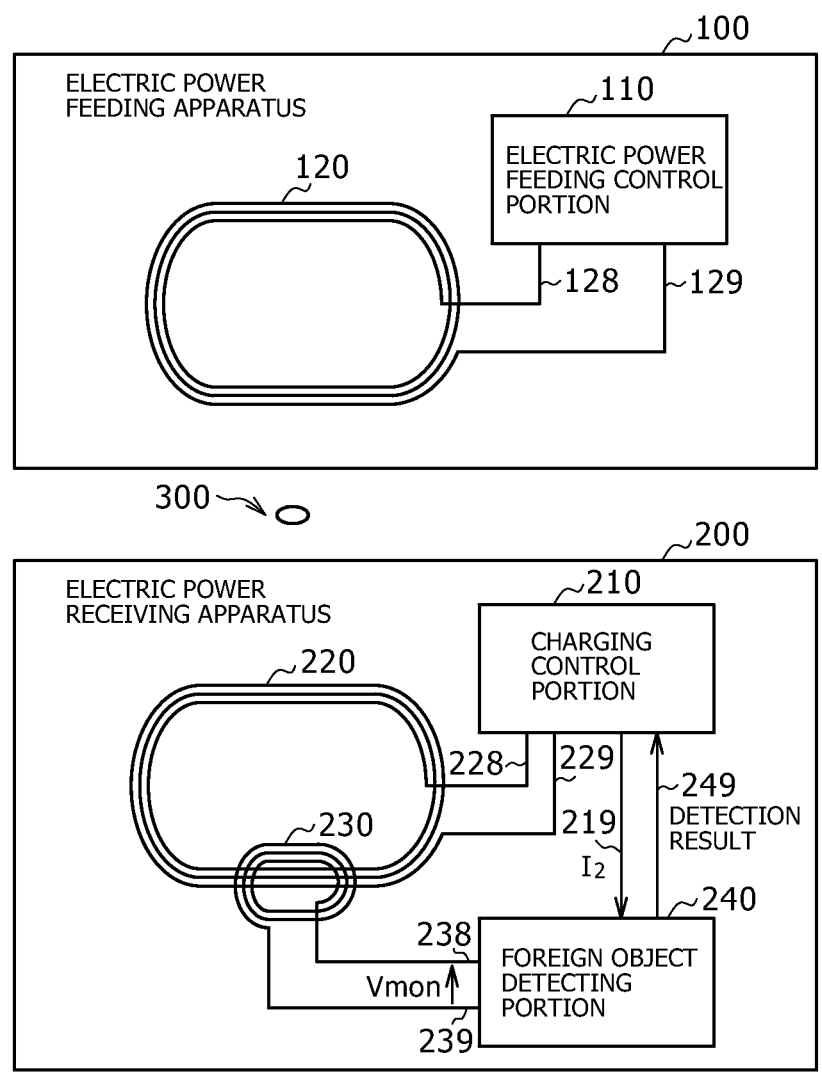
FIG. 1 is a block diagram, partly in view, showing an entire configuration of a non-contact type electric power feeding system as an electric power feeding system according to a first embodiment of the present disclosure.

FIG. 1 is a block diagram, partly in view, showing an entire configuration of a non-contact type electric power feeding system as an electric power feeding system according to a first embodiment of the present disclosure. The non-contact type electric power feeding system is a system which electrically supplies an electric power to an apparatus in a non-contact state. The non-contact type electric power feeding system includes an electric power feeding apparatus 100 and an electric power receiving apparatus 200.

The electric power feeding apparatus 100 supplies an A.C. power source by using an electromagnetic wave to the electric power receiving apparatus 200. The electric power feeding apparatus 100 includes an electric power feeding control portion 110 and an electric power feeding coil 120.

The electric power feeding control portion 110 controls an amount of electric power which is to be supplied to the electric power receiving apparatus 200. The electric power feeding control portion 110 supplies an A.C. electric power to the electric power feeding coil 120 through both of a signal line 128 and a signal line 129, and controls an amount of A.C. electric power. In addition, the electric power feeding control portion 110 receives a control signal in accordance with which an amount of fed electric power is controlled from the electric power receiving apparatus 200. When the electric power feeding control portion 110 has received the control signal, the electric power feeding control portion 110 controls an amount of fed electric power in accordance with the control signal concerned. A control signal in accordance with which electric power feeding is stopped, for example, is included in the control signal concerned.

When an electric power has been supplied from the electric power feeding control portion 110 to the electric power feeding coil 120, the electric power feeding coil 120 generates an electromagnetic wave in accordance with an Ampere's rule. A power source is supplied to the electric power receiving apparatus 200 through the electromagnetic wave thus generated.

The electric power receiving apparatus 200 receives the power source supplied thereto through the electromagnetic wave. The electric power receiving apparatus 200 includes a charging control portion 210, an electric power receiving coil 220, a measuring coil 230, and a foreign object detecting portion 240.

The charging control portion 210 charges the power source received from the electric power receiving coil 220 through a wiring 228 and a wiring 229 in a secondary battery or the like, and controls a current and a voltage in a phase of the charging. Specifically, the charging control portion 210 converts the A.C. power source thus received into a D.C. power source. Also, the charging control portion 210 controls the voltage and the current based on the characteristics, the charging time, and the like of the secondary battery.

In addition, the charging control portion 210 measures an induced current $I_2$ in the electric power receiving coil 220, and supplies a measured value of the induced current $I_2$ to the foreign object detecting portion 240 through a signal line 219. Ampere (A), for example, is used as a unit of the induced current $I_2$. In addition thereto, the charging control portion 210 receives a detection result in a phase of the detection of the foreign object from the foreign object detecting portion 240 through a signal line 249. Also, the charging control portion 210 transmits a control signal to the electric power feeding apparatus 100 based on the detection result in the phase of the detection of the foreign object. For example, when the foreign object has been detected, the charging control portion 210 transmits a control signal in accordance with which the electric power feeding is stopped. It is noted that the charging control portion 210 can also transmit a control signal in accordance with which when the foreign object has been detected, an amount of electric power is reduced by a given amount. As a result, even in the phase as well of the detection of the foreign object, the electric power is continuously fed.

The electric power receiving coil 220 is a coil which is disposed in a position where when the electromagnetic wave has been supplied from the electric power feeding coil 120 to the electric power receiving coil 220, an induced voltage corresponding to a change in a magnetic flux of the electromagnetic wave is induced in accordance with a law of electromagnetic induction.

The measuring coil 230 is a coil which is disposed in a position where a voltage corresponding to a receiving voltage in the electric power receiving coil 220 is induced by the electromagnetic wave from the electric power feeding coil 120. The measuring coil 230 is preferably disposed in such a way that the induced voltage induced in the measuring coil 230 by the magnetic field generated by the electric power receiving coil 220 gets a value smaller than a predetermined value. For example, if the measuring coil 230 is disposed in a position straddling a part of the electric power receiving coil 220, a mutual induction operation by the magnetic field generated by the electric power receiving coil 220 becomes very small and thus the induced voltage by the magnetic field concerned becomes very small.

In addition, a current is not substantially caused to flow through the measuring coil 230. Here, the wording "a current is not substantially caused to flow" means that opposite terminals of the measuring coil 230 are opened, and a current other than the induced current by the magnetic field is not caused to flow through the measuring coil 230. Or, the wording "a current is not substantially caused to flow" means that even when the opposite terminals of the measuring coil 230 are not opened, a resistor having a high resistance value is disposed. Therefore, even when the voltage is generated, only a small current is caused to flow. However, the foreign object detecting portion 240 which will be described later is connected between the opposite terminals of the measuring coil 230 thus opened through a signal line 238 and a signal line 239. By opening the opposite terminals of the measuring coil 230, the magnetic field from the measuring coil 230 hardly acts on the electric power receiving coil 220. As a result, the electric power receiving apparatus 200 can detect the foreign object without exerting any of influences on the charging control portion 210. It is noted that a resistor having a high impedance value may also be disposed between the opposite terminals of the measuring coil 230 instead of opening the opposite terminals of the measuring coil 230.

Here, an induced voltage V generated in a coil is proportional to a change in a magnetic flux Φ from Expression (1) based on the Faraday's law of electromagnetic induction. A unit of the magnetic flux, for example, is Weber (Wb), and a unit of the induced voltage V, for example, is volt (V):

$$V = -N\frac{d\phi}{dt} \quad (1)$$

where N is a number of winding of the coil, and t is time whose unit, for example, is second (s).

When the levels of the magnetic fields which the electric potential feeding apparatus 100 supplies can be regarded as being approximately uniform, magnetic flux densities B of the magnetic fluxes which pass through both of the electric power receiving coil 220 and the measuring coil 230 becomes identical to each other. A unit of the magnetic flux density B, for example, is Weber per square meter (Wb/m$^2$). When the magnetic flux densities B are identical to each other, a ratio of a magnetic flux $\Phi_2$ passing through the electric power receiving coil 220 to a magnetic flux $\Phi_3$ passing through the measuring coil 230 becomes equal to an area ratio of a coil surface of the electric power receiving coil 220 to a coil surface of the measuring coil 230. That is to say, when let $S_2$ and $S_3$ be the coil area of the electric power receiving coil 220 and the coil area of the measuring coil 230, respectively, $\Phi_2/\Phi_3$ is equal to $S_2/S_3$. A unit of each of the coil areas $S_2$ and $S_3$, for example, is square meter (m$^2$). Therefore, when let $N_2$ and $N_3$ be the number of winding of the electric power receiving coil 220, and the number of winding of the measuring coil 230, respectively, Expression (2) is obtained based on Expression (1):

$$V_{21} = (N_2/N_3) \times (S_2/S_3) \times \dot{V}_{31} \qquad (2)$$
$$\approx (N_2/N_3) \times (S_2/S_3) \times V_{mon}$$

where $V_{21}$ is the induced voltage in the electric power receiving coil 220, $\dot{V}_{31}$ is the induced voltage in the measuring coil 230 by the magnetic field generated in the electric power feeding coil 120, and Vmon is a voltage developed across the opposite terminals of the measuring coil 230. From Expression (2), the ratio of the electric power receiving coil 220 to the measuring coil 230 agrees with a value obtained by multiplying the ratio ($N_2/N_3$) between the numbers of winding by the area ratio ($S_2/S_3$) between the coil surfaces. Therefore, if the ratio between the numbers of winding, and the area ratio ($S_2/S_3$) between the coil surfaces are known, the induced voltage $V_{21}$ in the electric power receiving coil 220 is obtained from the induced voltage $V_{31}$ in the measuring coil 230. It is noted that the induced voltage $V_{21}$ in the electric power receiving coil 220 is an example of a receiving voltage claimed in the appended claims. That is to say, the receiving voltage in the electric power receiving coil 220 is the induced voltage $V_{21}$.

Strictly speaking, in addition to the induced voltage $V_{31}$ by the magnetic field generated by the electric power feeding coil 120, an induced voltage $V_{32}$ by the magnetic field generated by the electric power receiving coil 220 is also generated in the measuring coil 230. As previously stated, however, the induced voltage $V_{32}$ becomes very small because the measuring coil 230 is disposed in the position where the mutual induction operation by the magnetic field generated by the electric power receiving coil 220 becomes very small. Therefore, the voltage Vmon developed across the opposite terminals of the measuring coil 230 approximately agrees with the induced voltage $V_{21}$ in the electric power receiving coil 220. It is noted that the induced voltage $V_{32}$ is an example of a mutually induced voltage claimed in the appended claims. That is to say, the mutually induced voltage in the measuring coil 230 is the induced voltage $V_{32}$.

It is noted that it is difficult to directly measure the induced voltage $V_{21}$. The reason for this is because the load such as the charging control portion 210 is connected to the electric power receiving coil 220, due to this influence, the voltage developed across the opposite terminals of the electric power receiving coil 220 does not become the induced voltage $V_{21}$, and the presence of the foreign object exerts an influence on the induced voltage itself. If the load is disconnected from the electric power receiving coil 220 to set the opposite terminals of the electric power receiving coil 220 in the open state, then a value close to the induced voltage $V_{21}$ is measured. In this case, however, it may be impossible to calculate the value close to the induced voltage $V_{21}$ unless the current value, including a phase relationship is acquired concurrently with the calculation. By providing the measuring coil 230, the precise induced voltage $V_{21}$ is obtained during the charging from the induced voltage Vmon.

The foreign object detecting portion 240 estimates parameters which change in the electric power receiving coil 220 from both of the induced voltage Vmon in the measuring coil 230, and an induced current $I_2$ in the electric power receiving coil 220, thereby detecting presence or absence of the foreign object which impedes the receiving of the electromagnetic wave. The parameters which are changed in the electric power receiving coil 220 due to the presence of the foreign object include a resistance component and a reactance component in the impedance, and the like. The foreign object detecting portion 240 outputs the detection result representing presence or absence of the foreign object to the charging control portion 210 through the signal line 249.

Figure 2A:
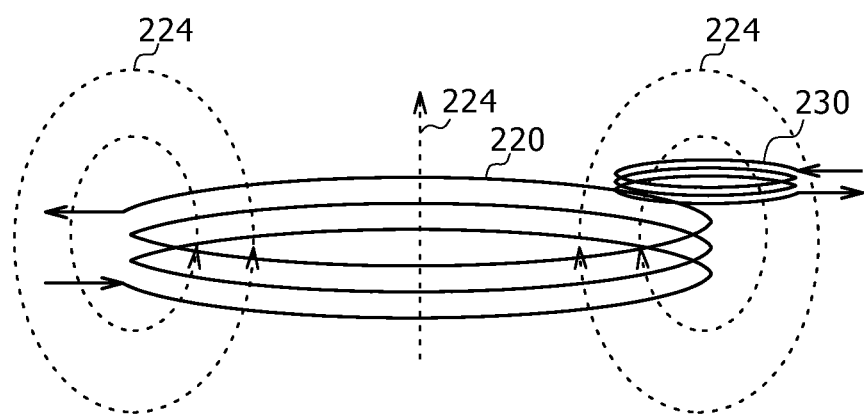
FIGS. 2A and 2B are views showing an example of a magnetic field generated by an electric power receiving coil in the non-contact type electric power feeding system according to the first embodiment of the present disclosure.
Figure 2B:
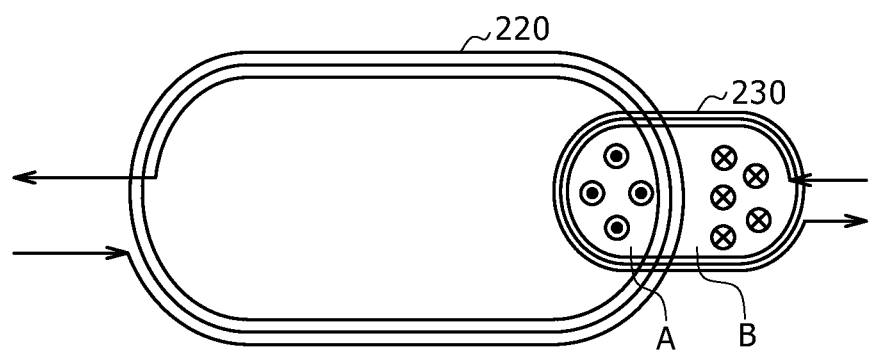

FIGS. 2A and 2B are views showing the magnetic field generated by the electric power receiving coil 220 in the non-contact type electric power feeding system of the first embodiment. A dotted line in FIG. 2A indicates a magnetic flux 224 in the magnetic field generated by the electric power receiving coil 220. When the induced current is generated in the electric power receiving coil 220 by the magnetic field from the electric power feeding apparatus 100, as shown in FIG. 2A, the electric power receiving coil 220 generates the magnetic field in accordance with the Ampere's rule. Here, in the case where the measuring coil 230 is disposed in the position where the measuring coil 230 straddles a part of the electric power receiving coil 220, of the coil surface of the measuring coil 230, an area overlapping the coil surface of the electric power receiving coil 220 is defined as an area A, and an area not overlapping the coil surface of the electric power receiving coil 220 is defined as an area B.

As shown in FIG. 2A, the magnetic flux 224 generated by the electric power receiving coil 220 passes through the area A, and goes half around a part of the circumference of the winding of the electric power receiving coil 220 to pass through the area B. For this reason, as shown in FIG. 2B, a direction of the magnetic flux 224 passing through the area A, and a direction of the magnetic flux 224 passing through the area B are opposite to each other. Therefore, the mutual induction operations by those magnetic fluxes cancel each other. As a result, the magnetic field generated by the electric power receiving coil 220 causes the induced voltage $V_{32}$ generated in the measuring coil 230 to become very small. The position of the measuring coil 230 is adjusted in such a way that the induced voltage $V_{32}$ falls within the range which is not a problem in terms of the measurement (becomes smaller than a predetermined value). It is noted that in a magnetic field distribution based on the Ampere's rule, the strength of the magnetic field generated inside the coil surface of the electric power receiving coil 220 becomes larger than that of the magnetic field generated outside the coil surface of the electric power receiving coil 220. For this reason, preferably, the measuring coil 230 is disposed in such a way that the area B located outside the electric power receiving coil 220 becomes slightly larger than the area A located inside the electric power receiving coil 220.

Figure 3:
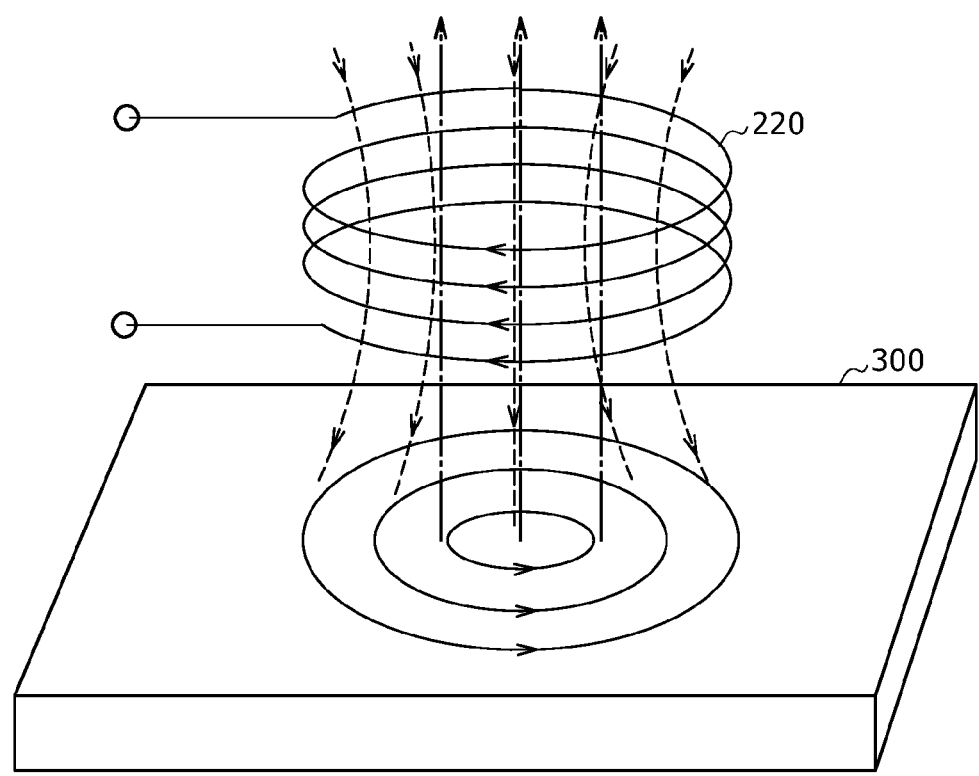
FIG. 3 is a view explaining a cause of changes in parameters in the electric power receiving coil in the non-contact type electric power feeding system according to the first embodiment of the present disclosure.

FIG. 3 is a view explaining the causes of the changes in the parameters in the electric power receiving coil 220 in the non-contact type electric power feeding system of the first embodiment. There is supposed the case where a conductive foreign object 300 such as a metal is present in an electromagnetic field generated by the electric power receiving coil 220. When the electromagnetic field is changed, an eddy current is generated in the conductive foreign object 300 due to the electromagnetic induction effect. The conductive foreign object 300 generates the heat due to the Joule heat caused by the eddy current. In addition, the magnetic current generated by the eddy current acts on the electric power receiving coil 220, thereby changing a resistance and a reactance in an equivalent circuit of the electric power receiving coil 220. Therefore, the electric power receiving apparatus 200 can determine presence or absence of the foreign object 300 from amounts of changes in the resistance and the reactance in the electric power receiving coil 220. In FIG. 3, an arrow of a dotted line indicates the magnetic field generated by the electric power receiving coil 220, and an arrow of a solid line indicates the eddy current. Also, an arrow of a dashed-dotted line indicates the magnetic field generated by the eddy current.

Figure 4:
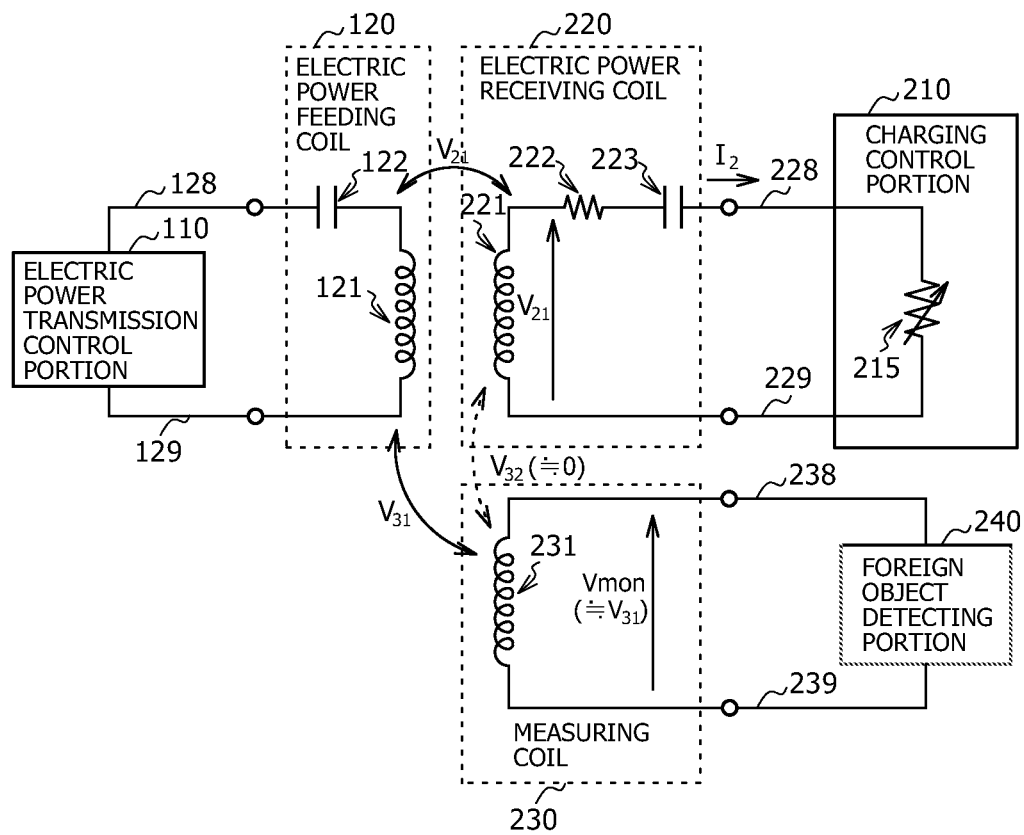
FIG. 4 is a circuit diagram showing an equivalent circuit of the non-contact type electric power feeding system according to the first embodiment of the present disclosure.

FIG. 4 is a circuit diagram showing an equivalent circuit of the non-contact type electric power feeding system according to the first embodiment of the present disclosure. The electric power feeding coil 120 is replaced with an equivalent circuit including a primary inductance ($L_1$) 121, and a primary capacitance ($C_1$) 122. The electric power receiving coil 220 is replaced with an equivalent circuit including a secondary inductance ($L_2$) 221, a secondary resistance ($r_2$) 222, and a secondary capacitance ($C_2$) 223. The charging control portion 210 is replaced with an equivalent circuit including a load resistance ($R_2$) 215. In the charging control portion 210, a rectifier is omitted. The measuring coil 230 is replaced with an equivalent circuit including an inductance ($L_3$) 231. As previously stated, when the foreign object is present, since in the equivalent circuit of the electric power receiving coil 220, at least one of the secondary resistance $r_2$ and the secondary inductance $L_2$ is changed, the foreign object is detected from the amounts of changes in the secondary resistance $r_2$ and the secondary inductance $L_2$. It is noted that in this equivalent circuit, both of a resistance of the measuring coil 230 and a resistance of the electric power feeding coil 120 are omitted.

In this equivalent circuit, let $V_{21}$ be an induced voltage generated in the secondary inductance 221 of the electric power receiving coil 220 by the magnetic field generated by the electric power feeding coil 120. In addition, let $V_{31}$ be an induced voltage generated in the measuring coil 230 by the magnetic field generated by the electric power feeding coil 120. On the other hand, let $V_{32}$ be an induced voltage generated in the measuring coil 230 by the magnetic field generated by the electric power receiving coil 220. However, since the measuring coil 230 is disposed in such a way that the mutual induction operation by the magnetic field generated by the electric power receiving coil 220 becomes very small, the induced voltage $V_{32}$ becomes very small. Therefore, the voltage developed across the opposite terminals of the measuring coil 230 is approximately equal to the induced voltage $V_{31}$. The foreign object detecting portion 240 acquires the voltage developed across the opposite terminals of the measuring coil 230 in the form of the monitoring induced voltage Vmon ($\approx V_{31}$). In addition, the charging control portion 210 acquires the induced current $I_2$ which is caused to flow through the electric power receiving coil 220.

[Configuration of Electric Power Feeding Control Portion]

Figure 5:
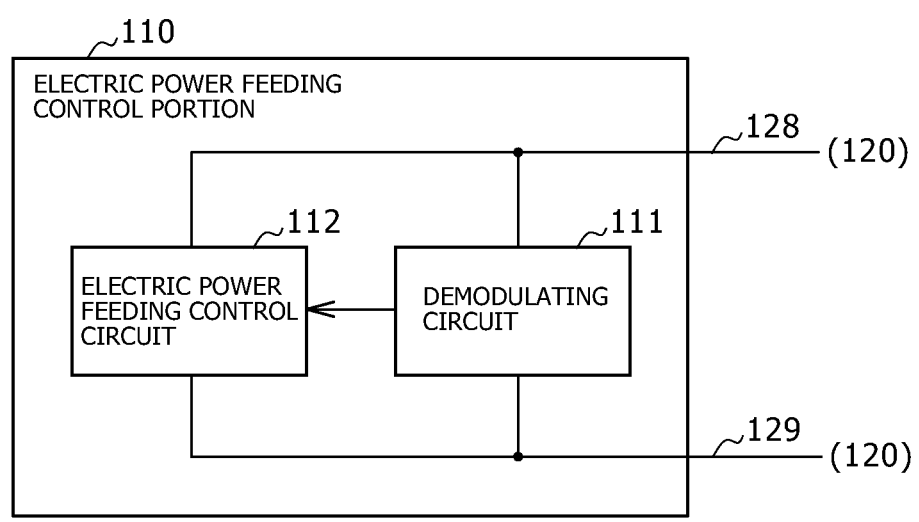
FIG. 5 is a block diagram showing a configuration of an electric power feeding control portion in the non-contact type electric power feeding system according to the first embodiment of the present disclosure.

FIG. 5 is a block diagram showing a configuration of the electric power feeding control portion 110 in the non-contact type electric power feeding system according to the first embodiment of the present disclosure. The electric power feeding control portion 110 includes a demodulating circuit 111 and an electric power feeding control circuit 112.

The demodulating circuit 111 demodulates an A.C. signal supplied thereto from the electric power receiving apparatus 200, thereby fetching out a control signal which is superimposed on the A.C. signal. The demodulating circuit 111 outputs the control signal thus fetched out to the electric power feeding control circuit 112. The electric power feeding control circuit 112 controls an amount of electric power which is supplied to the electric power receiving apparatus 200 in accordance with the control signal.

[Configuration of Charging Control Portion]

Figure 6:
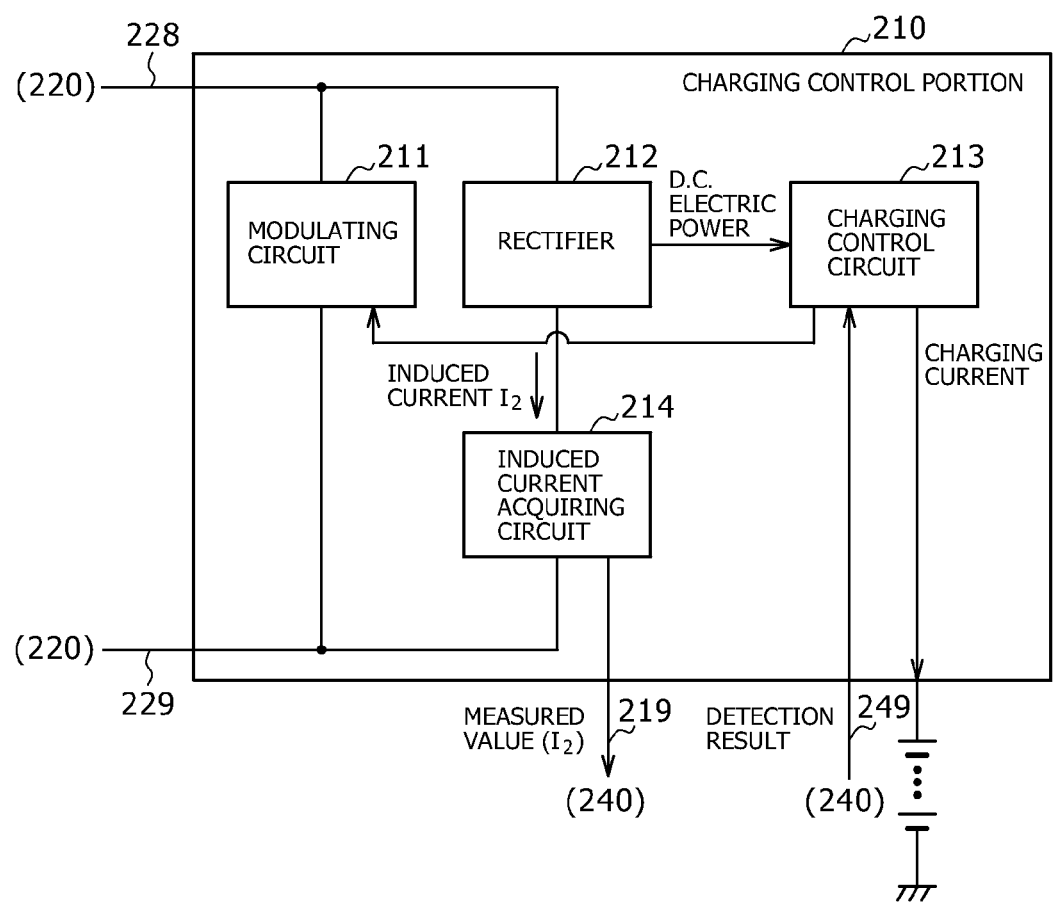
FIG. 6 is a block diagram showing a configuration of a changing control portion in the non-contact type electric power feeding system according to the first embodiment of the present disclosure.

FIG. 6 is a block diagram showing a configuration of the charging control portion 210 in the non-contact type electric power feeding system according to the first embodiment of the present disclosure. The charging control portion 210 includes a modulating circuit 211, a rectifier 212, a charging control circuit 213, and an induced current acquiring circuit 214.

The modulating circuit 211 modulates amplitude or the like of the A.C. signal supplied to the electric power feeding apparatus 100, thereby superimposing the control signal on the A.C. signal. The modulating circuit 211 superimposes the control signal in accordance with which, for example, the electric power feeding is stopped on the A.C. current in accordance with the control made by the charging control circuit 213, thereby transmitting the resulting A.C. signal to the electric power feeding apparatus 100. It is noted that the modulating circuit 211 is an example of a control signal transmitting circuit claimed in the appended claims.

The rectifier 212 converts an A.C. electric power into a D.C. electric power, and supplies the resulting D.C. electric power to the charging control circuit 213. The charging control circuit 213 charges a secondary battery or the like with the electricity by controlling a voltage or a current of the D.C. electric power obtained through the A/D conversion. In addition, the charging control circuit 213 either stops or reduces the supply of the charging current to the secondary battery or the like in the phase of the detection of the foreign object. The reduction of the charging current suppresses a rise in a temperature of the foreign object due to the magnetic field from the electric power receiving apparatus 200. When it may be impossible to cope with the rise in the temperature of the foreign object even in accordance with the control for the charging current (for example, when the charging current cannot be reduced any more), the charging control circuit 213 transmits the control signal through the modulating circuit 211. It is noted that the charging control circuit 213 may transmit the result of the control for the charging current to the electric power feeding apparatus 100. In addition, the charging control circuit 213 may transmit only the control signal to the electric power feeding apparatus 100 without carrying out the control for the receiving current in the phase of the detection of the foreign object.

The induced current acquiring circuit 214 acquires the induced current $I_2$ which is caused to flow through the electric power receiving coil 220. The induced current acquiring circuit 214 measures the induced current $I_2$, and subjects the analog measured value to Analog to Digital (A/D) conversion as may be necessary, thereby supplying the resulting digital measured value to the foreign object detecting portion 240. It is noted that although the induced current acquiring circuit 214 acquires the A.C. induced current, the induced current acquiring circuit 214 may acquire the D.C. induced current obtained through the A/D conversion in the rectifier 212 instead of acquiring the A.C. induced current.

[Configuration of Foreign Object Detecting Portion]

Figure 7:
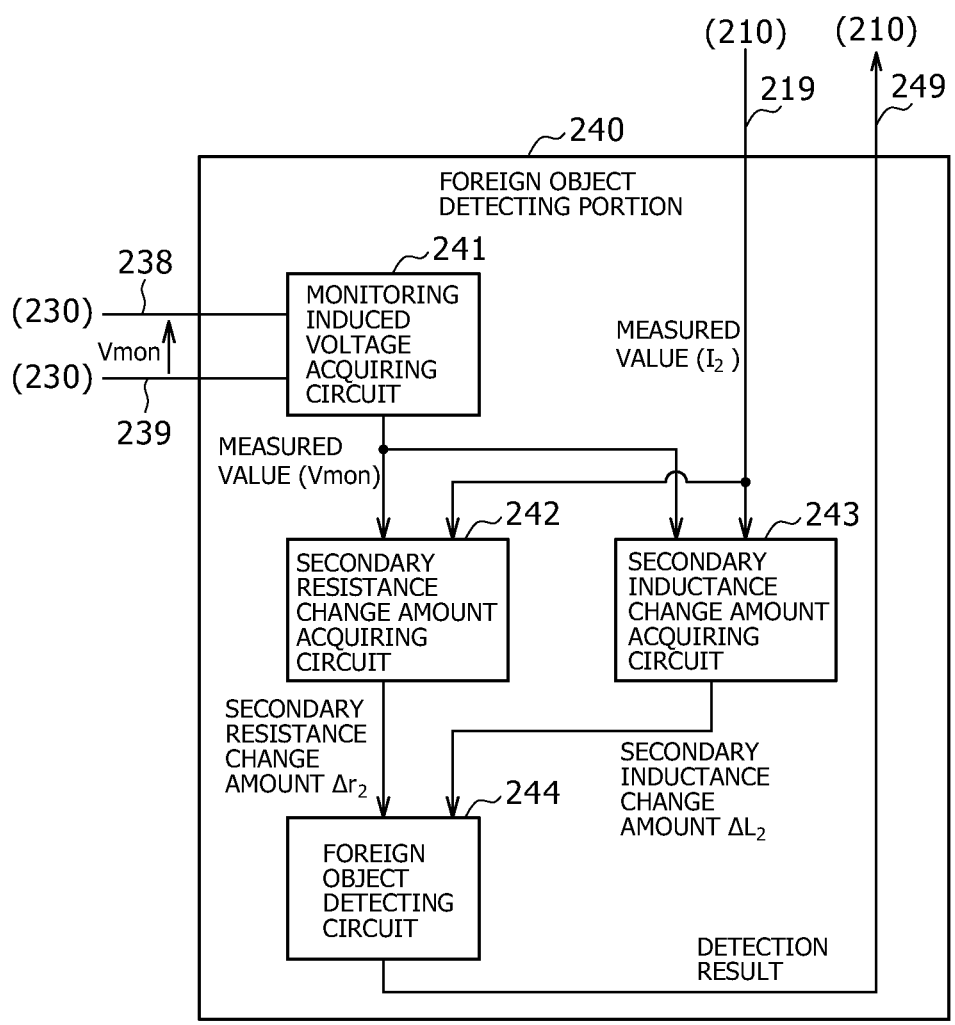
FIG. 7 is a block diagram showing a configuration of a foreign object detecting portion in the non-contact type electric power feeding system according to the first embodiment of the present disclosure.

FIG. 7 is a block diagram showing a configuration of the foreign object detecting portion 240 in the non-contact type electric power feeding system according to the first embodiment of the present disclosure. The foreign object detecting portion 240 includes a monitoring induced voltage acquiring circuit 241, a secondary resistance change amount acquiring circuit 242, a secondary inductance change amount acquiring circuit 243, and a foreign object detecting circuit 244.

The monitoring induced voltage acquiring circuit 241 acquires the monitoring induced voltage Vmon in the measuring coil 230. For example, the monitoring induced voltage acquiring circuit 241 measures the monitoring induced voltage Vmon by using an A.C. voltmeter connected to the opposite terminals of the measuring coil 230. The monitoring induced voltage acquiring circuit 241 subjects the measured value of the monitoring induced voltage Vmon to the A/D conversion as may be necessary, and supplies the resulting digital measured value of the monitoring induced voltage Vmon to each of the secondary resistance change amount acquiring circuit 242 and the secondary inductance change amount acquiring circuit 243. It is noted that the monitoring induced voltage acquiring circuit 241 is an example of a voltage acquiring circuit claimed in the appended claims.

The secondary resistance change amount acquiring circuit 242 acquires an amount of change in the resistance in the electric power receiving coil 220 in the form of a secondary resistance change amount $\Delta r_2$ from both of the measured value of the monitoring induced voltage Vmon and the measured value of the induced current $I_2$. The secondary resistance change amount acquiring circuit 242 calculates a secondary resistance $R_2$ by, for example, using Expression (3):

$$r_2 = \text{Re}(\dot{V}_{21}/\dot{I}_2) - R_2 \qquad (3)$$
$$= \text{Re}\{(N_2/N_3)(S_2/S_3) \times (\dot{V}_{mon}/\dot{I}_2)\} - R_2$$

where "Re( )" is a function which returns a real part of a complex number expressed within ( ) $V_{21}$ is the A.C. induced voltage generated in the electric power receiving coil 220 due to the change in the magnetic field generated by the electric power feeding coil 120, $R_2$ is the load resistance of the load in the charging control portion 210, $N_2$ is the number of winding of the electric power receiving coil 220, $N_3$ is the number of winding of the measuring coil 230, $S_2$ is the area of the coil surface of the electric power receiving coil 220, and $S_3$ is the area of the coil surface of the measuring coil 230. Here, the voltage V or current I in which a dot is added to a top portion thereof represents the A.C. voltage or the A.C. current which is described by the complex number. Also, a unit of $R_2$, for example, is ohm ($\Omega$), and a unit of each of the areas of the coil surfaces $S_2$ and $S_3$, for example, is square meter (m²). A method of deriving Expression (3) will be described later.

The secondary resistance change amount acquiring circuit 242 calculates a secondary resistance change amount $\Delta r_2$ from the secondary resistance $r_2$ thus calculated by using Expression (4). The secondary resistance change amount acquiring circuit 242 outputs the secondary resistance change amount $\Delta r_2$ thus calculated to the foreign object detecting circuit 244.

$$\Delta r_2 = r_2 - r_0 \qquad (4)$$

where $r_0$ is an original secondary resistance, of the electric power receiving coil 220, which is measured when the foreign object is absent.

The secondary inductance change amount acquiring circuit 243 acquires an amount of change of inductance in the equivalent circuit of the electric power receiving coil 220 in the form of a secondary inductance change amount $\Delta L_2$ from the measured value of the monitoring induced voltage Vmon and the measured value of the induced current $I_2$. The secondary inductance change amount acquiring circuit 243 calculates the secondary inductance $L_2$ by, for example, using Expression (5):

$$L_2 = \frac{1}{\omega}\{\text{Im}(\dot{V}_{21}/\dot{I}_2) + 1/(\omega C_2)\} \qquad (5)$$
$$= \frac{1}{\omega}\{(N_2/N_3)(S_2/S_3)\text{Im}(\dot{V}_{mon}/\dot{I}_2) + 1/(\omega C_2)\}$$

where "Im( )" is a function which returns an imaginary part of a complex number expressed within ( ) and $\omega$ is an angular frequency, and $C_2$ is a capacitance in the equivalent circuit of the electric power receiving coil 220. Here, a unit of the angular frequency $\omega$ is radian/sec (rad/s), and a unit of the capacitance $C_2$, for example, is farad (F). A method of deriving Expression (5) will be described later.

The secondary inductance change amount acquiring circuit 243 calculates a secondary inductance change amount $\Delta L_2$ from the secondary inductance $L_2$ thus calculated by using Expression (6). The secondary resistance change amount acquiring circuit 242 outputs the secondary inductance change amount $\Delta L_2$ thus calculated to the foreign object detecting circuit 244:

$$\Delta L_2 = L_2 - L_0 \qquad (6)$$

where $L_0$ is the original inductance of the electric power receiving coil 220 which is measured when the foreign object is absent.

The foreign object detecting circuit 244 detects presence or absence of the foreign object from both of the secondary resistance change amount $\Delta r_2$ and the secondary inductance change amount $\Delta L_2$. For example, the foreign object detecting circuit 244 compares the secondary resistance change amount $\Delta r_2$ and the secondary inductance change amount $\Delta L_2$ with threshold values Th1 and Th2, respectively. The threshold value Th1 is a threshold value with which the secondary resistance change amount $\Delta r_2$ is compared. Also, the threshold value Th2 is a threshold value with which the secondary inductance change amount $\Delta L_2$ is compared. Also, the foreign object detecting circuit 244 determines that the foreign object is present, for example, either when the secondary resistance change amount $\Delta r_2$ is equal to or larger than the threshold value Th1 or when the secondary inductance change amount $\Delta L_2$ is equal to or larger than the threshold value Th2. The foreign object detecting circuit 244 outputs the result of the detection of the foreign object to the charging control portion 210.

It is noted that the foreign object detecting portion 240 may determine that the foreign object is present when the secondary resistance change amount $\Delta r_2$ is equal to or larger than the threshold value Th1 and when the secondary inductance change amount $\Delta L_2$ is equal to or larger than the threshold value Th2. As will be described later in a second embodiment of the present disclosure, the foreign object detecting portion 240 may determine that the foreign object is present when the secondary inductance change amount $\Delta L_2$ is not acquired and the secondary resistance change amount $\Delta r_2$ is equal to or larger than the threshold value Th1. Or, the foreign object detecting portion 240 may also determine that the foreign object is present when the secondary resistance change amount $\Delta r_2$ is not acquired and the secondary inductance change amount $\Delta L_2$ is equal to or larger than the threshold value Th2. Or, the foreign object detecting portion 240 may also determine that the foreign object is present when an addition value of the secondary resistance change amount $\Delta r_2$ and the secondary inductance change amount $\Delta L_2$ is equal to or larger than a threshold value.

Here, the value of the secondary resistance change amount $\Delta r_2$ and the value of the secondary inductance change amount $\Delta L_2$ for the supplied voltage differ depending on a size and a physical property of the foreign object. For this reason, a kind of material object is specified based on these values. In particular, since a temperature of the foreign object rises along with an increase of the secondary resistance change amount $\Delta r_2$, the current to be received is controlled in such a way that the temperature of the foreign object becomes lower than a certain values, thereby suppressing the rise in the temperature of the foreign object.

Figure 8:
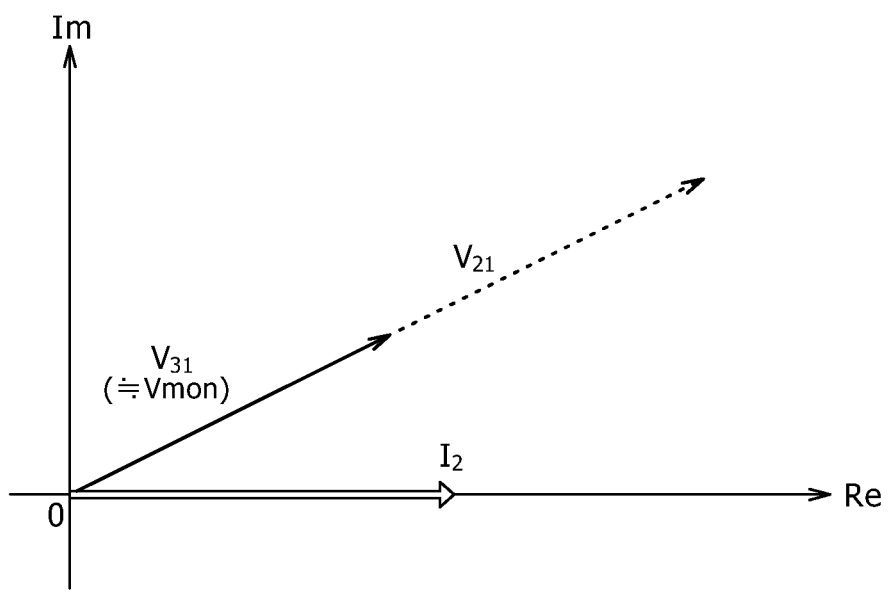
FIG. 8 is a graphical representation explaining a method of calculating an induced voltage in the non-contact type electric power feeding system according to the first embodiment of the present disclosure.

FIG. 8 is graphical representation explaining a method of calculating the induced voltage in the first embodiment of the present disclosure. In FIG. 8, an axis of ordinate represents an imaginary part of the A.C. current which is expressed in the form of the complex number, and an axis of abscissa represents a real part thereof. From the equivalent circuit exemplified in FIG. 3, the induced voltage $V_{31}$ ($\approx$Vmon) due to the change in the magnetic field generated by the electric power feeding coil 120 is generated in the measuring coil 230.

In addition, the induced voltage $V_{21}$ in the electric power receiving coil 220 is obtained from the number $N_2$ of winding of the electric power receiving coil 220, and the like based on Expression (7):

$$V_{21} = N_2 \frac{d}{dt} \int\int \mu \cdot Hd_{21} \cdot n \cdot ds_2 \tag{7}$$

where $\mu$ is a magnetic permeability, $Hd_{21}$ is strength of the magnetic field generated in the coil surface of the electric power receiving coil 220, and n is a normal line vector. Here, a unit of the strength of the magnetic field, for example, is Ampere/meter (A/m).

On the other hand, the induced voltage $V_{31}$ of the measuring coil 230 is obtained from the number $N_3$ of winding of the measuring coil 230, and the like based on Expression (8):

$$V_{31} = N_3 \frac{d}{dt} \int\int \mu \cdot Hd_{31} \cdot n \cdot ds_3 \tag{8}$$

where $Hd_{31}$ is strength of the magnetic field generated in the coil surface of the measuring coil 230.

On the condition of the case where the magnetic fields radiated by the electric power feeding apparatus 100 are uniform, the strength $Hd_{21}$ of the magnetic field of the electric power receiving coil 220, and the strength $Hd_{31}$ of the magnetic field of the measuring coil 230 become approximately equal to each other. Therefore, Expression (9) holds:

$$\frac{d}{dt}\int\int \mu \cdot Hd_{21} \cdot n \cdot ds_2 \approx \frac{d}{dt}\int\int \mu \cdot Hd_{31} \cdot n \cdot ds_3 = S_2/S_3 \tag{9}$$

Expression (2) described above is obtained from Expressions (7), (8), and (9).

In addition, Expression (10) is obtained from the equivalent circuit exemplified in FIG. 4:

$$\dot{V}_{21} = (1/j\omega C_2 + R_2 + j\omega L_2 + r_2) \cdot \dot{I}_2 \tag{10}$$

The real parts of both of the members in Expression (10) are obtained by substituting the right member in Expression (2) into Expression (10), thereby deriving Expression (4). In addition, the imaginary parts of both of the members in Expression (10) are obtained by substituting the right member of Expression (2) into Expression (10), thereby deriving Expression (6).

[Operation of Electric Power Feeding Apparatus]

Figure 9:
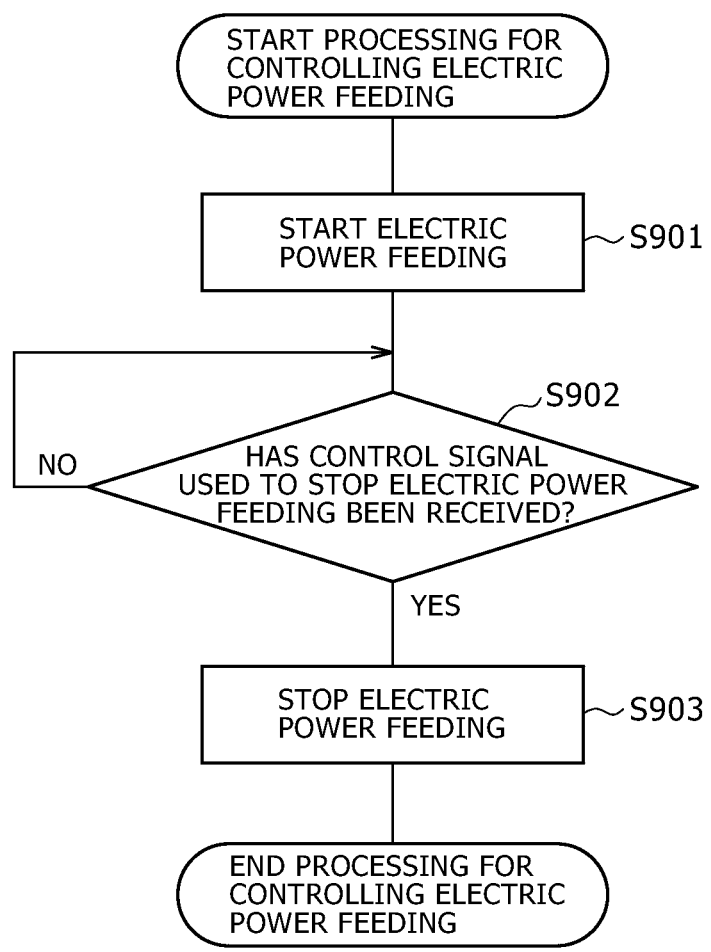
FIG. 9 is a flow chart showing processing for controlling electric power feeding in the non-contact type electric power feeding system according to the first embodiment of the present disclosure.

FIG. 9 is a flow chart showing processing for controlling the electric power feeding in the non-contact type electric power feeding system according to the first embodiment of the present disclosure. The processing for controlling the electric power feeding is started by the electric power feeding apparatus 100 when, for example, the power source is applied to the electric power feeding apparatus 100.

The electric power feeding apparatus 100 starts the electric power feeding of the A.C. power source (Step S901). The electric power feeding apparatus 100 determines whether or not the control signal in accordance with which the electric power feeding is stopped has been received (Step S902). When it is determined in the processing in Step S902 that the control signal in accordance with which the electric power feeding is stopped has not been received (Step S902: No), the operation of the electric power feeding apparatus 100 returns back to the processing in Step S902, and the electric power feeding apparatus 100 continuously carries out the electric power feeding. On the other hand, when it is determined in the processing in Step S902 that the control signal in accordance with which the electric power feeding is stopped has been received (Step S902: Yes), the electric power feeding apparatus 100 stops the electric power feeding (Step S903). After completion of the processing in Step S903, the electric power feeding apparatus 100 ends the processing for controlling the electric power feeding.

[Operation of Electric Power Receiving Apparatus]

Figure 10:
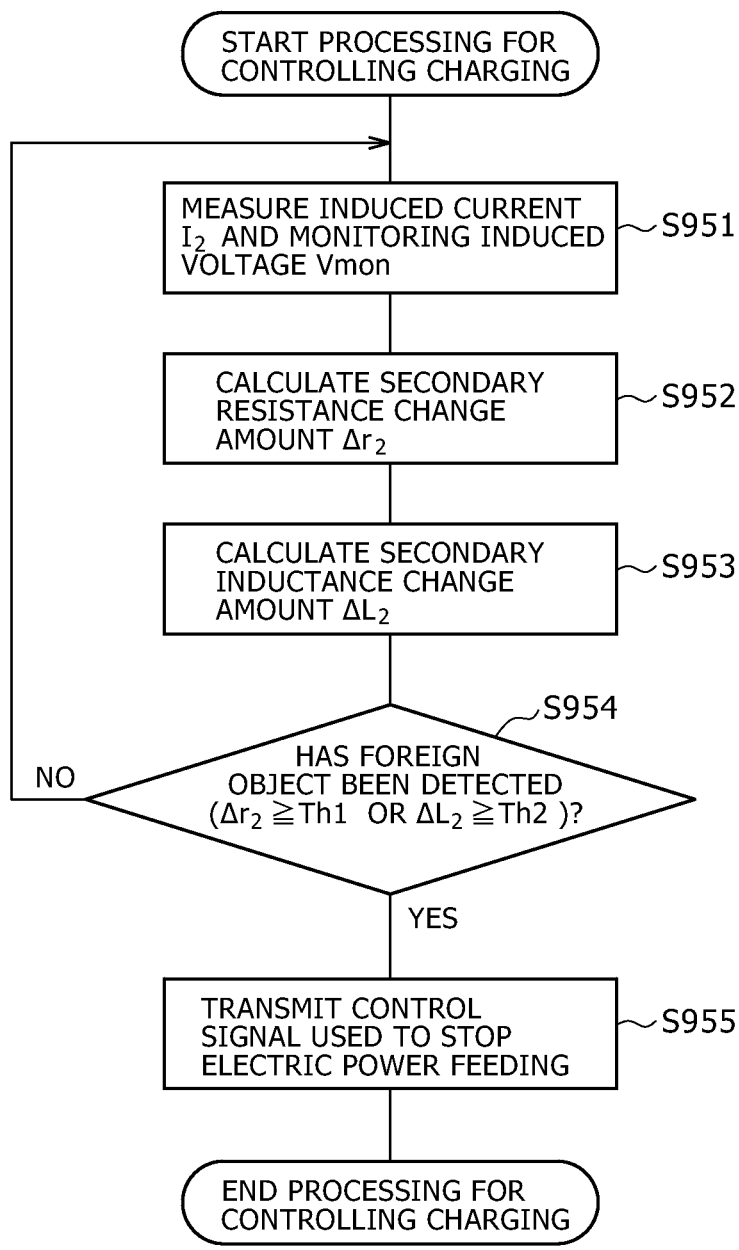
FIG. 10 is a flow chart showing processing for controlling charging in the non-contact type electric power feeding system according to the first embodiment of the present disclosure.

FIG. 10 is a flow chart showing processing for controlling the charging in the non-contact type electric power feeding system according to the first embodiment of the present disclosure. The processing for controlling the charging is started by the electric power receiving apparatus 200 when, for example, the supply of the power source from the electric power feeding apparatus 100 is started.

The electric power receiving apparatus 200 measures both of the induced current $I_2$ and the monitoring induced voltage Vmon (Step S951). The electric power receiving apparatus 200 calculates the secondary resistance change amount $\Delta r_2$ by substituting the induced current $I_2$ and the monitoring induced voltage Vmon into Expressions (3) and (4) (Step S952). In addition, the electric power receiving apparatus 200 calculates the secondary inductance change amount $\Delta L_2$ by substituting the induced current $I_2$ and the monitoring induced voltage Vmon into Expressions (5) and (6) (Step S953).

The electric power receiving apparatus 200 determines whether or not the foreign object has been detected depending on whether the secondary resistance change amount $\Delta r_2$ is equal to or larger than the threshold value Th1, or the secondary inductance change amount $\Delta L_2$ is equal to or larger than the threshold value Th2 (Step S954). When it is determined in processing in Step S954 that the foreign object has not been detected (Step S954: No), the operation of the electric power receiving apparatus 200 returns back to the processing in Step S951. On the other hand, when it is determined in the processing in Step S954 that the foreign object has been detected (Step S954: Yes), the electric power receiving apparatus 200 transmits the control signal in accordance with which the electric power feeding is stopped to the electric power feeding apparatus 100 as may be necessary by controlling the charging current (Step S955). After completion of the processing in Step S955, the electric power receiving apparatus 200 ends the processing for controlling the charging.

Figure 11:
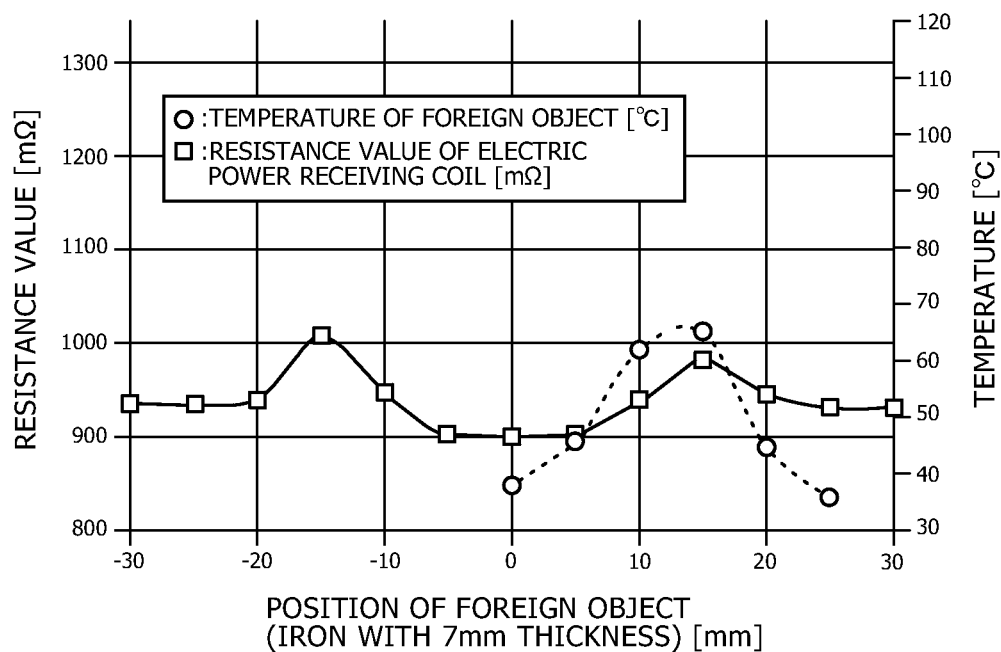
FIG. 11 is a graph showing a relationship between a temperature of an iron material having a thickness of 7 mm, and a resistance value of the electric power receiving coil in the non-contact type electric power feeding system according to the first embodiment of the present disclosure.
Figure 12:
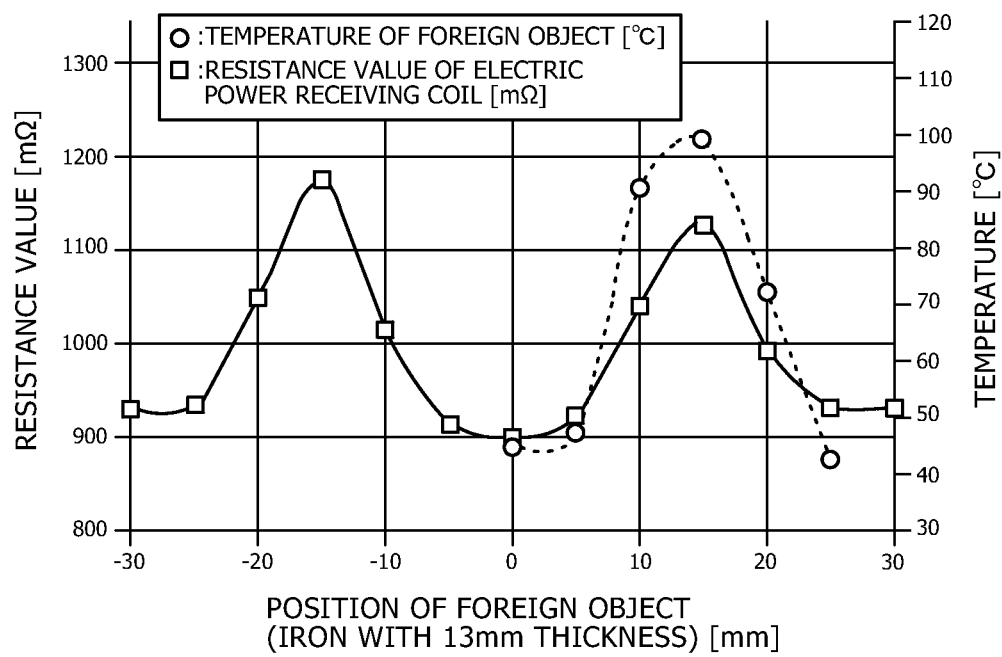
FIG. 12 is a graph showing a relationship between a temperature of an iron material having a thickness of 13 mm, and a resistance value of the electric power receiving coil in the non-contact type electric power feeding system according to the first embodiment of the present disclosure.
Figure 13:
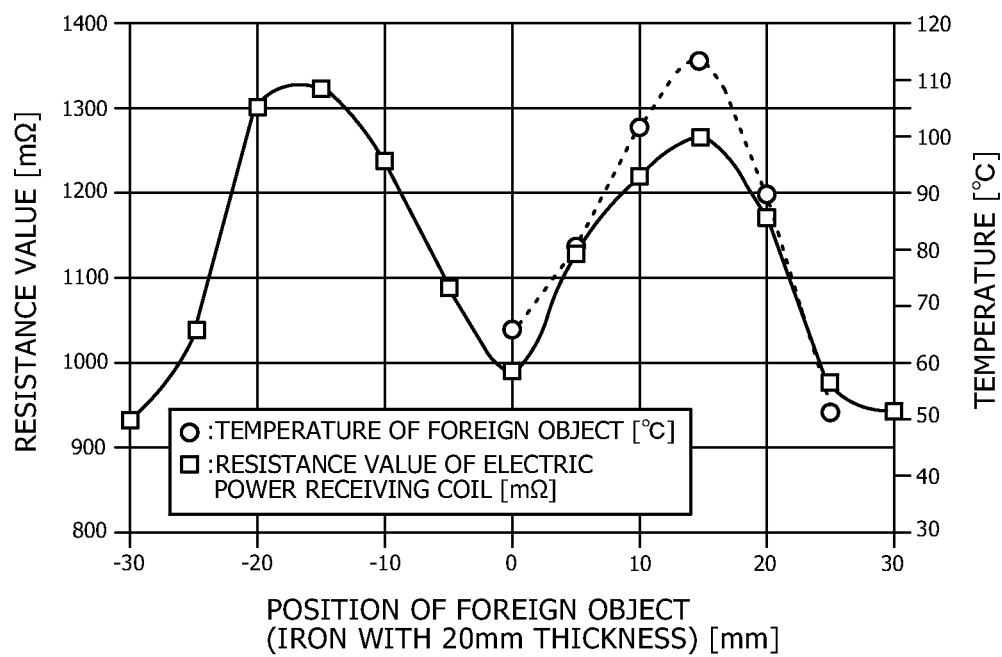
FIG. 13 is a graph showing a relationship between a temperature of an iron material having a thickness of 20 mm, and a resistance value of the electric power receiving coil in the non-contact type electric power feeding system according to the first embodiment of the present disclosure.

FIGS. 11, 12, and 13 are graphs showing examples of a relationship between the temperature of the foreign object, and the resistance value of the coil in the non-contact type electric power feeding system according to the first embodiment of the present disclosure. In FIGS. 11, 12, and 13, an axis of ordinary represents the temperature of the foreign object or the resistance value of the coil, and an axis of abscissa represents a position of the foreign object. Here, a unit of the temperature is degree (° C.), and a unit of the resistance value is milliohm (mΩ). Also, a unit of the position is millimeter (mm). In the axis of abscissa, a position on a predetermined straight line which includes a center of the coil and is parallel with the coil surface is measured as the position of the foreign object with the center of the coil as the origin. In addition, in FIGS. 11, 12, and 13, circular marks represent the plotted data on the results of the measurements of the temperature of the foreign object, and quadrangular marks represent plotted data on the results of the measurements of the resistance value of the electric power receiving coil 220.

FIG. 11 shows the measurement results when an iron material which is 0.5 mm in thickness and is 7 mm square is inserted as the foreign object between the coils. FIG. 12 shows the measurement results when an iron material which is 0.5 mm in thickness and is 13 mm square is inserted as the foreign object between the coils. Also, FIG. 13 shows the measurement results when an iron material which is 0.5 mm in thickness and is 20 mm square is inserted as the foreign object between the coils.

As exemplified in FIGS. 11, 12, and 13, when the foreign object is placed in a position located slightly away from each of the centers of the coils, the temperature of the foreign object becomes high, and the resistance value of each of the coils (120 and 220) is also increased. On the other hand, when the foreign object is placed in the vicinity of each of the centers of the coils (120 and 220), the temperature of the foreign object becomes low, and the resistance value of each of the coils is also reduced. The reason for this, as previously stated, is because the Joule heat is generated by the eddy current within the foreign object, and due to the operation of the magnetic field generated by the eddy current, the parameters such as the resistance values of the coils, and the like are changed.

It is noted that in FIGS. 11, 12, and 13, the temperature when the position is represented by a negative number is not measured. The reason for this is because it is estimated that the change in the temperature when the position is represented by the negative number is the same as that in the temperature when the position is represented by a positive number.

As has been described, according to the first embodiment of the present disclosure, the electric power receiving apparatus 200 can detect the foreign object in the magnetic field described above based on the amount of change, in the impedance of the electric power receiving coil 220, which is acquired from both of the monitoring induced voltage Vmon, and the induced current $I_2$ of the electric power receiving coil 220. Since the amount of change in the impedance of the electric power receiving coil 220 is changed when the foreign object enters between the coils, the foreign object is precisely detected from the amount of change in the impedance of the electric power receiving coil 220.

Figure 14:
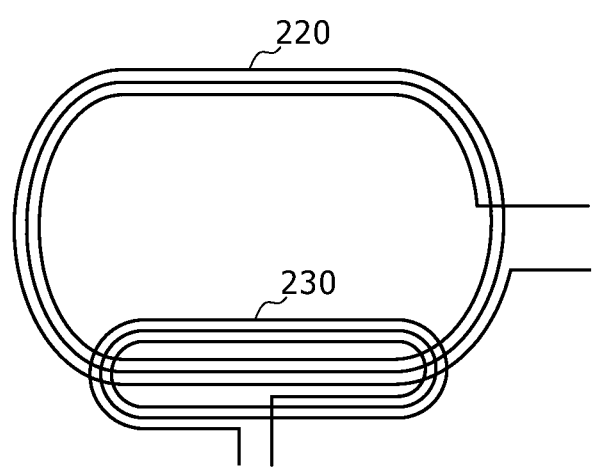
FIG. 14 is a view showing a structure of a measuring coil in a non-contact type electric power feeding system according to a first change of the first embodiment of the present disclosure.
Figure 15:
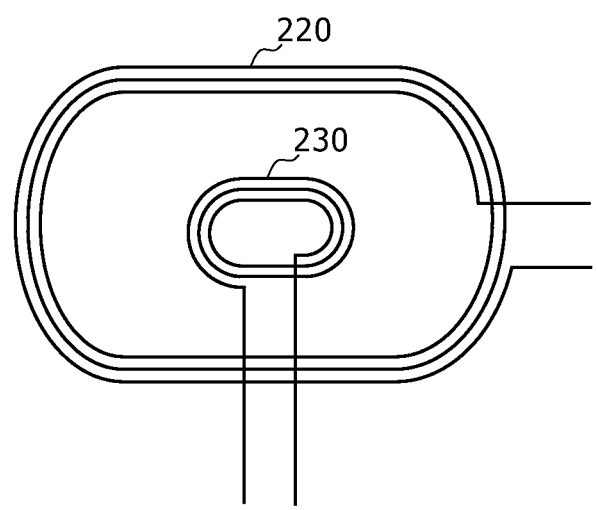
FIG. 15 is a view showing a structure of a measuring coil in a non-contact type electric power feeding system according to a second change of the first embodiment of the present disclosure.

The shape and position of the measuring coil 230 are arbitrarily set as long as the mutual induction operation by the magnetic field generated by the electric power receiving coil 220 becomes small. For example, as exemplified in FIG. 14, the coil surface of the measuring coil 230 may have an elliptical shape close to a rectangular shape. In addition, as shown in FIG. 15, the coil surface of the measuring coil 230 may be made smaller than that of the electric power receiving coil 220 in order to dispose the measuring coil 230 at the center of the electric power receiving coil 220. The magnetic field (A/m) becomes weaker at the center of the coil surface of the electric power receiving coil 220 than in the vicinity of the outer circumference of the coil surface of the electric power receiving coil 220. The reason for this is because a distance from the winding of the electric power receiving coil 220 is longer at the center of the electric power receiving coil 220 than in the vicinity of the outer circumference of the electric power receiving coil 220. Since the magnetic field at the center of the electric power receiving coil 220 is relatively weak, the measuring coil 230 is disposed in the central portion of the electric power receiving coil 220, whereby it is possible to reduce the operation by the magnetic field generated by the electric power receiving coil 220.

Figure 16:
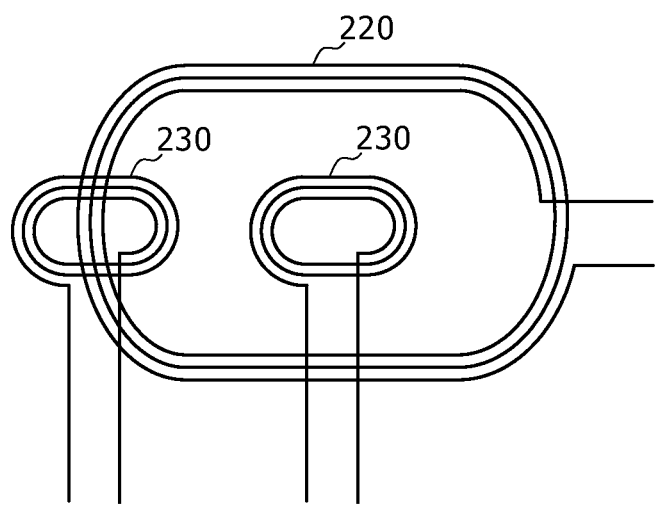
FIG. 16 is a view showing a structure of a measuring coil in a non-contact type electric power feeding system according to a third change of the first embodiment of the present disclosure.

In addition, as exemplified in FIG. 16, plural measuring coils 230 may also be disposed. In this case, the foreign object detecting portion 240 measures amounts of changes in the individual impedances of the plural measuring coils 230. Also, the foreign object detecting portion 240 determines that the foreign objects are present when, for example, the amount of change in any of the plural measuring coils 230 is equal to or larger than the threshold value. Or, the foreign object detecting portion 240 detects an amount of statistics (such as an average value) of amounts of changes in the individual impedances of the plural measuring coils 230, and determines that the foreign objects are present when the amount of statistics is equal to or larger than a threshold value.

It is noted that the non-contact type electric power feeding system according to the first embodiment of the present disclosure feeds the electric power by using both of the electric power feeding coil 120 and the electric power receiving coil 220, and transmits and receives the control signal. However, a coil for transmitting and receiving the control signal is provided in the non-contact type electric power feeding system of the first embodiment separately from both of the electric power feeding coil 120 and the electric power receiving coil 220, and the electric power feeding apparatus 100 and the electric power receiving apparatus 200 transmit and receive the control signal by using the coil concerned.

2. Second Embodiment

[Configuration of Foreign Object Detecting Portion]

Figure 17:
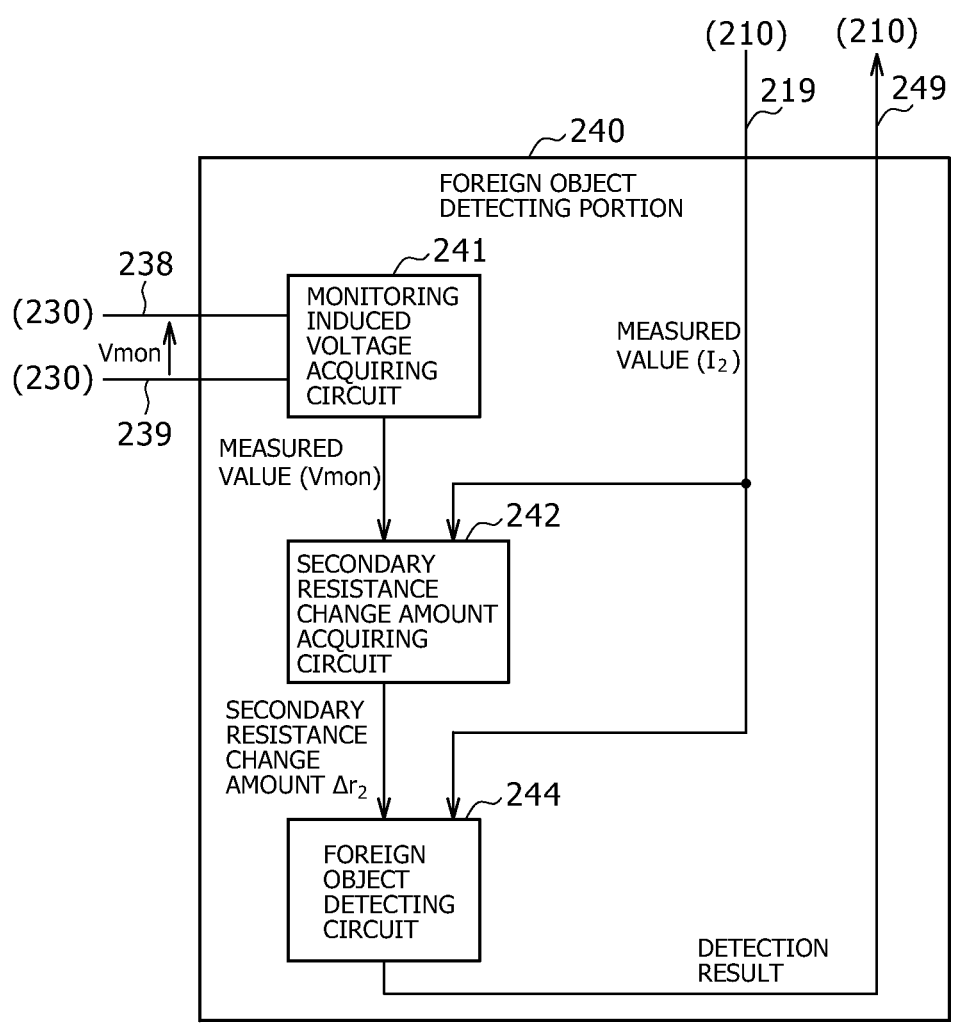
FIG. 17 is a block diagram showing a configuration of a foreign object detecting portion in a non-contact type electric power feeding system according to a second embodiment of the present disclosure.

FIG. 17 is a block diagram showing a configuration of a foreign object detecting portion 240 in a non-contact type electric power feeding system according to a second embodiment of the present disclosure. The foreign object detecting portion 240 in the non-contact type electric power feeding system of the second embodiment is different from that in the non-contact type electric power feeding system of the first embodiment in that the foreign object detecting portion 240 does not acquire the secondary inductance change amount $\Delta L_2$, but detects presence or absence of the foreign object based on only the secondary resistance change amount $\Delta r_2$. Specifically, the foreign object detecting portion 240 in the non-contact type electric power feeding system of the second embodiment is different from that in the non-contact type electric power feeding system of the first embodiment in that the foreign object detecting portion 240 does not include the secondary inductance change amount acquiring 243.

A foreign object detecting circuit 244 of the foreign object detecting portion 240 in the second embodiment detects the foreign object based on both of the secondary resistance change amount $\Delta r_2$ and the induced current $I_2$. For example, the foreign object detecting circuit 244 in the second embodiment calculates $(\Delta r_2 \times I_2 \times I_2)$, and determines that the foreign object is present when a value of $(\Delta r_2 \times I_2 \times I_2)$ is equal to or larger than a threshold value Th1'. The reason for this is because an amount of heat of the Joule heat due to the eddy current is proportional to the value of $(\Delta r_2 \times I_2 \times I_2)$.

[Operation of Electric Power Receiving Apparatus]

Figure 18:
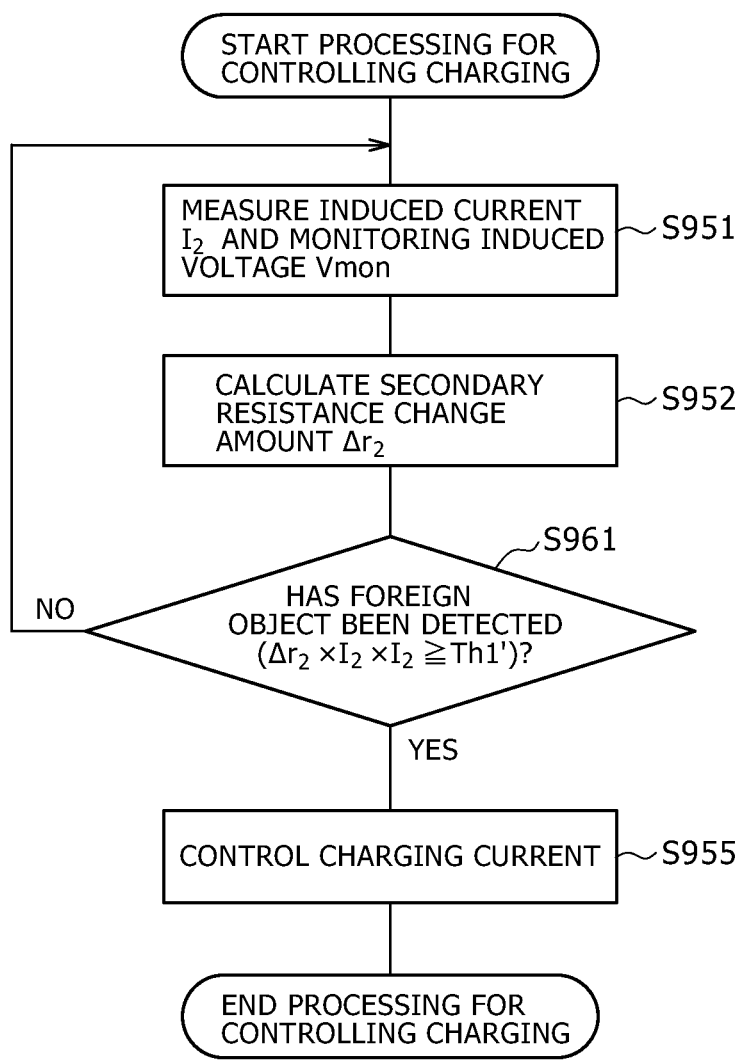
FIG. 18 is a flow chart showing processing for control charging in the non-contact type electric power feeding system according to the second embodiment of the present disclosure.

FIG. 18 is a flow chart showing processing for controlling the charging in the non-contact type electric power feeding system according to the second embodiment of the present disclosure. The processing for controlling the charging in the second embodiment is different from that in the first embodiment in that processing in Step S961 is executed instead of executing both of the processing in Steps S953 and S954.

After completion of the calculation of the secondary resistance change amount $\Delta r_2$ (Step S952), the electric power receiving apparatus 200 determines whether or not the foreign object has been detected depending on whether or not the value of $(\Delta r_2 \times I_2 \times I_2)$ is equal to or larger than the threshold value Th1' (Step S961). When it is determined in the processing in Step S961 that the foreign object has not been detected (Step S961: No), the operation of the electric power receiving apparatus 200 returns back to the processing in Step S951. On the other hand, when it is determined in the processing in Step S961 that the foreign object has been detected (Step S961: Yes), the electric power receiving apparatus 200 transmits the control signal in accordance with which the electric power feeding is stopped as may necessary to the electric power feeding apparatus 100 by controlling the charging current (Step S955).

As has been described above, according to the second embodiment of the present disclosure, the electric power receiving apparatus 200 in the non-contact type electric power feeding system of the second embodiment can detect the foreign object which can generate the heat from both of the secondary resistance change amount $\Delta r_2$ and the induced current $I_2$. For this reason, an amount of fed electric power is controlled in the phase of the detection of the foreign object, whereby the non-contact type electric power feeding system of the second embodiment can prevent the foreign object from generating the heat.

3. Third Embodiment

[Operation of Electric Power Receiving Apparatus]

Figure 19:
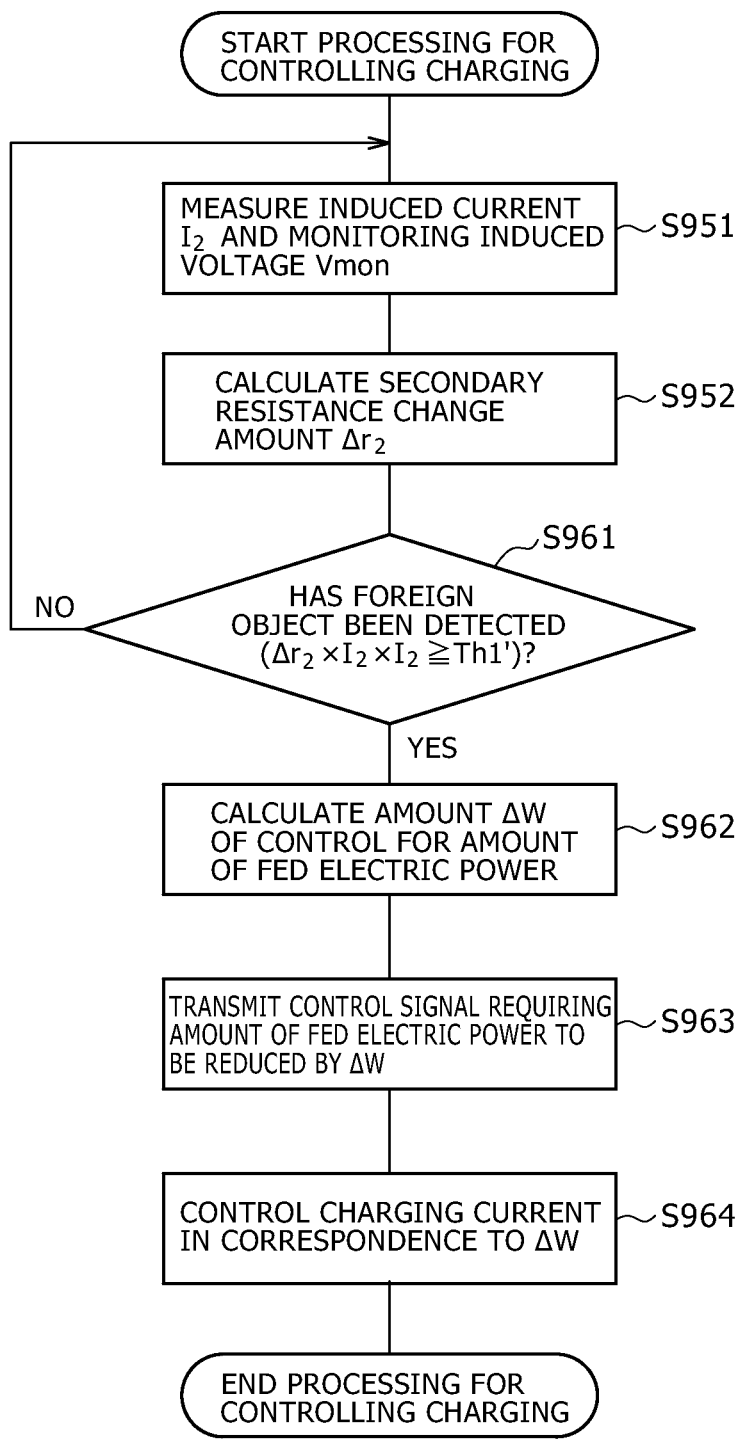
FIG. 19 is a flow chart showing processing for control charging in a non-contact type electric power feeding system as an electric power feeding system according to a third embodiment of the present disclosure.

FIG. 19 is a flow chart showing processing for controlling the charging in a non-contact type electric power feeding system according to a third embodiment of the present disclosure. The processing for controlling the charging in the third embodiment is different from that in the second embodiment in that an amount of control for an amount of fed electric power is further calculated in a phase of detection of a foreign object. A configuration of a foreign object detecting portion 240 in the third embodiment is the same as that of the foreign object detecting portion 240 in the second embodiment. However, the foreign object detecting circuit 244 in the third embodiment calculates an amount $\Delta W$ of control for an amount of fed electric power in the phase of the detection of the foreign object. In addition, a charging control portion 210 in the third embodiment controls the charging current in correspondence to the amount $\Delta W$ of control for the amount of fed electric power.

Here, a rise amount $\Delta T$ of temperature of a foreign object is generally obtained from Expression (11) based on a thermal resistance $R_t$ of the foreign object. A unit of the thermal resistance $R_t$ of the foreign object, for example, is degree/watt (° C./W).

$$\Delta T \approx \Delta r_2 \times I_2 \times I_2 / R_t \tag{11}$$

where $I_2$ having no dot added thereto represents an absolute value of an A.C. induced current $I_2$.

In Expression (11), let $I_{2L}$ be a value of the induced current in the electric power receiving coil 220 in the case where the rise amount $\Delta T$ of temperature expressed by Expression (11) becomes such a rise amount $\Delta T$ of temperature that a damage or the like of an apparatus is not caused. A supplied electric power $W_{1L}$ necessary for generating the value $I_{2L}$ of the induced current is calculated from Expression (12):

$$\begin{aligned} W_{1L} &= \eta \times W_{2L} \\ &= \eta \times (R_2 + r_0) \times I_{2L} \times I_{2L} \end{aligned} \tag{12}$$

where n is an electric power feeding efficiency, and $W_{2L}$ is a received electric power when the value of the induced current is $I_{2L}$.

On the other hand, when let $I_{2H}$ be a value of the induced current in the electric power receiving coil 220 when the foreign object is detected, a supplied electric power $W_{1H}$ necessary for generating the value $I_{2H}$ of the induced current is calculated from Expression (13):

$$\begin{aligned} W_{1H} &= \eta \times W_{2H} \\ &= \eta \times (R_2 + r_2) \times I_{2H} \times I_{2H} \end{aligned} \tag{13}$$

where $W_{2H}$ is a received electric power when the value of the induced current is $I_{2H}$.

The amount $\Delta W$ of control is calculated from Expression (14) based on Expression (12) and (13). It is noted that there is the case where the electric power feeding efficiency supposed by the electric power receiving apparatus 200 is different from the actual value, or the case where the electric power receiving apparatus 200 cannot acquire the electric power feeding efficiency itself. In order to cope with such a situation, the electric power receiving apparatus 200 may transmit a ratio $(\Delta W / W_{2H})$ of the amount $\Delta W$ of control to the received electric power $W_{2H}$, or a value of $(W_{2H} - W_{2L})$ to the electric power feeding apparatus 100 instead of transmitting thereto the amount $\Delta W$ of control. It is only necessary that the electric power feeding apparatus 100 converts the value thus received into the amount $\Delta W$ of control based on Expressions (12) to (14), thereby controlling an amount of fed electric power.

$$\Delta W = W_{1H} - W_{1L} \tag{14}$$

[Operation of Electric Power Receiving Apparatus]

The processing for controlling the charging exemplified in FIG. 19 is different from that in the second embodiment in that three pieces of processing in Steps S962 to S964 are executed instead of executing the processing in Step S955. When it is determined in processing in Step S961 that the foreign object has been detected (Step S961: Yes), the electric power receiving apparatus 200 calculates the amount ΔW of control for the amount of fed electric power from Expression (14) (Step S962). Then, the electric power receiving apparatus 200 transmits a control signal in accordance with which the amount of fed electric power is reduced by the amount ΔW of control is transmitted as may be necessary (Step S963). The electric power receiving apparatus 200 controls the charging current in correspondence to the amount ΔW of control (Step S964).

Figure 20:
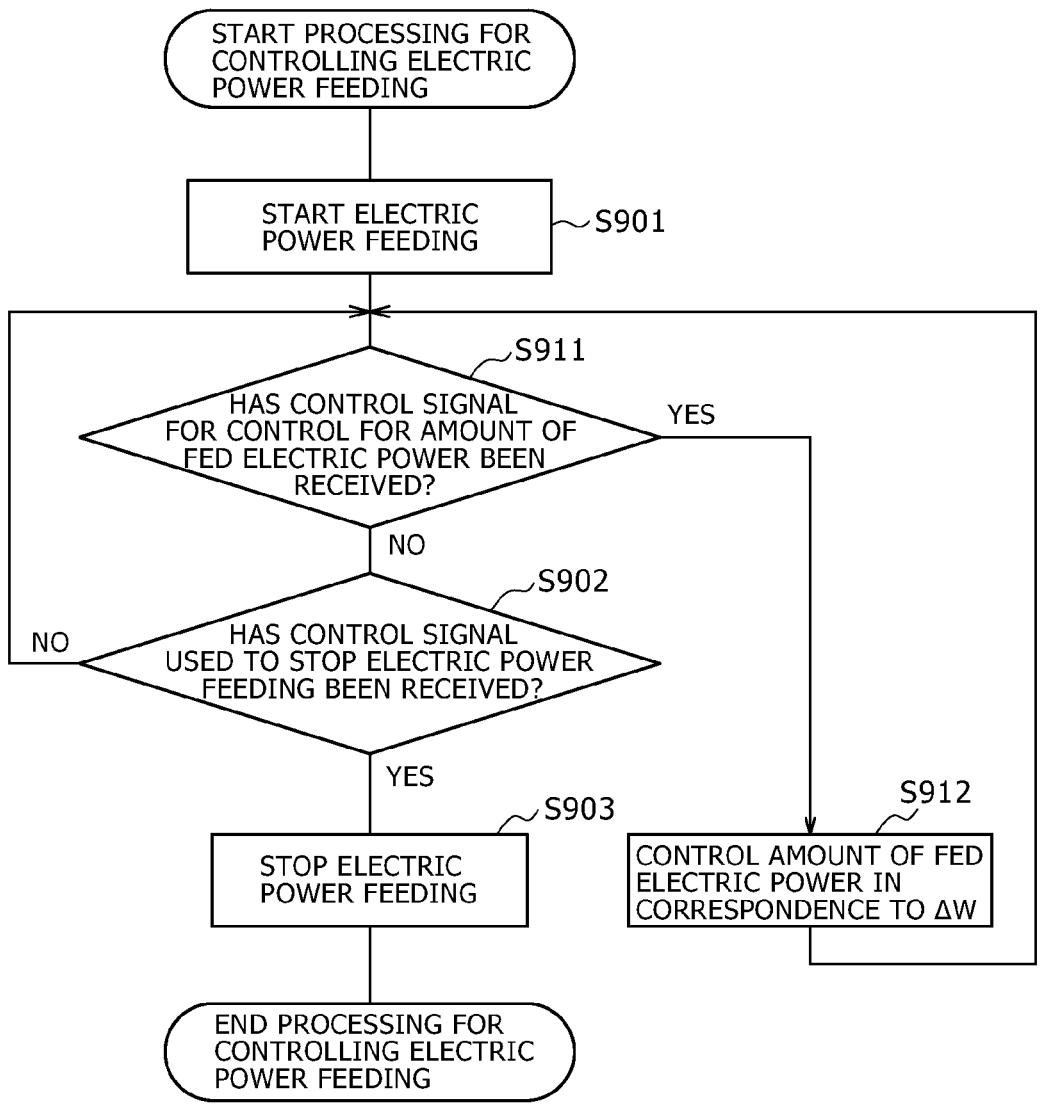
FIG. 20 is a flow chart showing processing for controlling electric power feeding in the non-contact type electric power feeding system according to the third embodiment of the present disclosure.

FIG. 20 is a flow chart showing processing for controlling the electric power feeding in the non-contact type electric power feeding system according to the third embodiment of the present disclosure. The processing for controlling the electric power feeding in the third embodiment is different from that in the first embodiment in that two pieces of pressing in Step S911 and S912 are further executed.

After start of the electric power feeding (Step S901), the electric power feeding apparatus 100 determines whether or not the control signal in accordance with which the amount of fed electric power is controlled in correspondence to the amount ΔW of control has been received (Step S911). When it is determined in the processing in Step S911 that the control signal in accordance with which the amount of fed electric power is controlled in correspondence to the amount ΔW of control has been received (Step S911: Yes), the electric power feeding apparatus 100 controls the amount of fed electric power in correspondence to the amount ΔW of control (Step S912) according to the control signal. Also, the operation of the electric power feeding apparatus 100 returns back to the processing in Step S911.

On the other hand, when it is determined in the processing in Step S911 that the control signal in accordance with which the amount of fed electric power is controlled in correspondence to the amount ΔW of control has not been received (Step S911: No), the electric power feeding apparatus 100 executes predetermined pieces of processing in and after processing in Step S902.

As has been described above, according to the third embodiment of the present disclosure, the electric power receiving apparatus 200 can detect the foreign object, and can also obtain the amount of control for the amount of fed electric power. As a result, in the phase as well of the detection of the foreign object, the non-contact type electric power feeding system of the third embodiment can continuously feed the electric power with the suitable amount of electric power.

4. Fourth Embodiment

[Configuration of Non-Contact Electric Power Feeding System]

Figure 21:
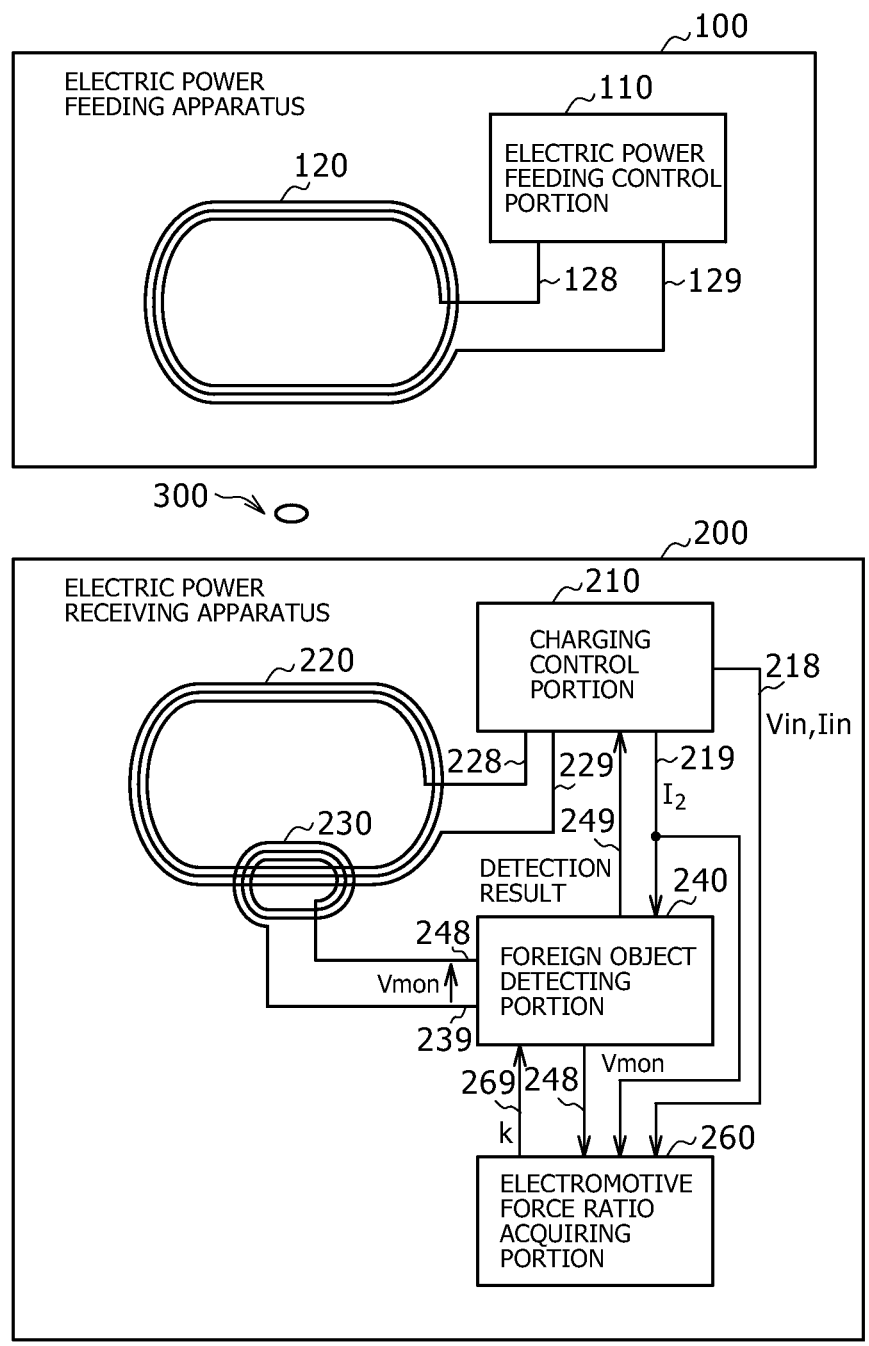
FIG. 21 is a block diagram, partly in view, showing an entire configuration of a non-contact type electric power feeding system as an electric power feeding system according to a fourth embodiment of the present disclosure.

FIG. 21 is a block diagram, partly in view, showing an entire configuration of a non-contact electric power feeding system according to a fourth embodiment of the present disclosure. In the non-contact electric power feeding system of the first embodiment, the impedance is calculated on the assumption that the ratio (hereinafter referred to as "the electromotive force ratio") of the induced voltage $V_{21}$ in the electric power receiving coil 220 to the induced voltage $V_{31}$ in the measuring coil 230 agrees with the value obtained by multiplying the ratio in number of winding of the electric power receiving coil 220 to the measuring coil 230, and the area ratio of the electric power receiving coil 220 to the measuring coil 230. Actually, however, the electromotive power ratio k ($=V_{21}/V_{31}$) does not agree with the multiplied value ($N_2/N_3 \times S_2/S_3$) of the winding ratio and the area ratio due to the dispersion of the characteristics of the coils in the phase of the manufacture, the position shift, and the like in some cases. The non-contact electric power feeding system of the fourth embodiment is different from that of the first embodiment in that the electric power receiving apparatus 200 acquires a precise value of the electromotive power ratio k before the detection of the foreign object. Specifically, the non-contact electric power feeding system of the fourth embodiment is different from that of the first embodiment in that the non-contact electric power feeding system further includes an electromotive force ratio acquiring portion 260.

In addition, the charging control portion 210 of the non-contact electric power feeding system of the fourth embodiment outputs an input voltage Vin and an input current Iin, and the secondary current $I_2$ to the electromotive force ratio acquiring portion 260 through signal lines 218 and 219, respectively. The input voltage Vin is a voltage inputted across the opposite input terminals of the charging control circuit 213. The input current Iin is a current which is caused to flow through the electric power receiving control circuit 213. In addition, the foreign object detecting portion 240 in the fourth embodiment outputs the monitoring induced voltage Vmon to the electromotive force ratio acquiring portion 260 through a signal line 248.

The electromotive force ratio acquiring portion 260 calculates the load resistance $R_2$ from both of the input voltage Vin and the input current Iin. The electromotive force ratio acquiring portion 260 acquires at least two sets each composed of the monitoring induced voltage Vmon, the secondary current $I_2$, and the load resistance $R_2$. The electromotive force ratio acquiring portion 260, for example, substitutes values of the two sets into Expression (15) to generate a system of linear equations, and calculates a value of the electromotive force ratio k by solving the system of linear equations thus generated. It is noted that the electromotive force ratio acquiring portion 260 may calculate the optimal value of the electromotive force ratio k by using a least-square method. In addition, the time at which the electromotive force ratio k is calculated is arbitrarily set as long as the time for the calculation of the electromotive force ratio k is carried out before start of the electric power feeding such as a phase of factory shipment or a phase of repair.

$$r_2 = Re\{k \times (\dot{V}_{mon}/\dot{I}_2)\} - R_2 \quad (15)$$

In Expression (15), "$(N_2/N_3)(S_2/S_3)$" expressed in Expression (3) is replaced with the electromotive force ratio k. Expression (3) holds on the assumption that the electromotive force ratio k agrees "$(N_2/N_3)(S_2/S_3)$." As described above, however, since the electromotive force ratio k does not agree with "$(N_2/N_3)(S_2/S_3)$" in some cases, preferably, the monitoring induced voltage Vmon, the secondary current $I_2$, and the load resistance $R_2$ in each of the at least two sets are substituted into Expression (15), thereby calculating the precise value of the electromotive force ratio k. The electromotive force ratio acquiring portion 260 outputs the electromotive force ratio k thus calculated to the foreign object detecting portion 240. The foreign object detecting portion 240 calculates the secondary resistance change amount $\Delta r_2$ based on the electromotive force ratio k by using Expression (15).

It is noted that although the configuration is adopted such that the electromotive force ratio acquiring portion 260 is provided inside the electric power receiving apparatus 200, it is also possible to adopt a configuration such that the electromotive force ratio acquiring portion 260 is provided outside the electric power receiving apparatus 200. In addition, it is also possible to adopt a configuration that in the fourth embodiment, the foreign object detecting portion 240 is not provided in the phase of the acquisition of the electromotive force ratio k.

[Configuration of Changing Control Portion]

Figure 22:
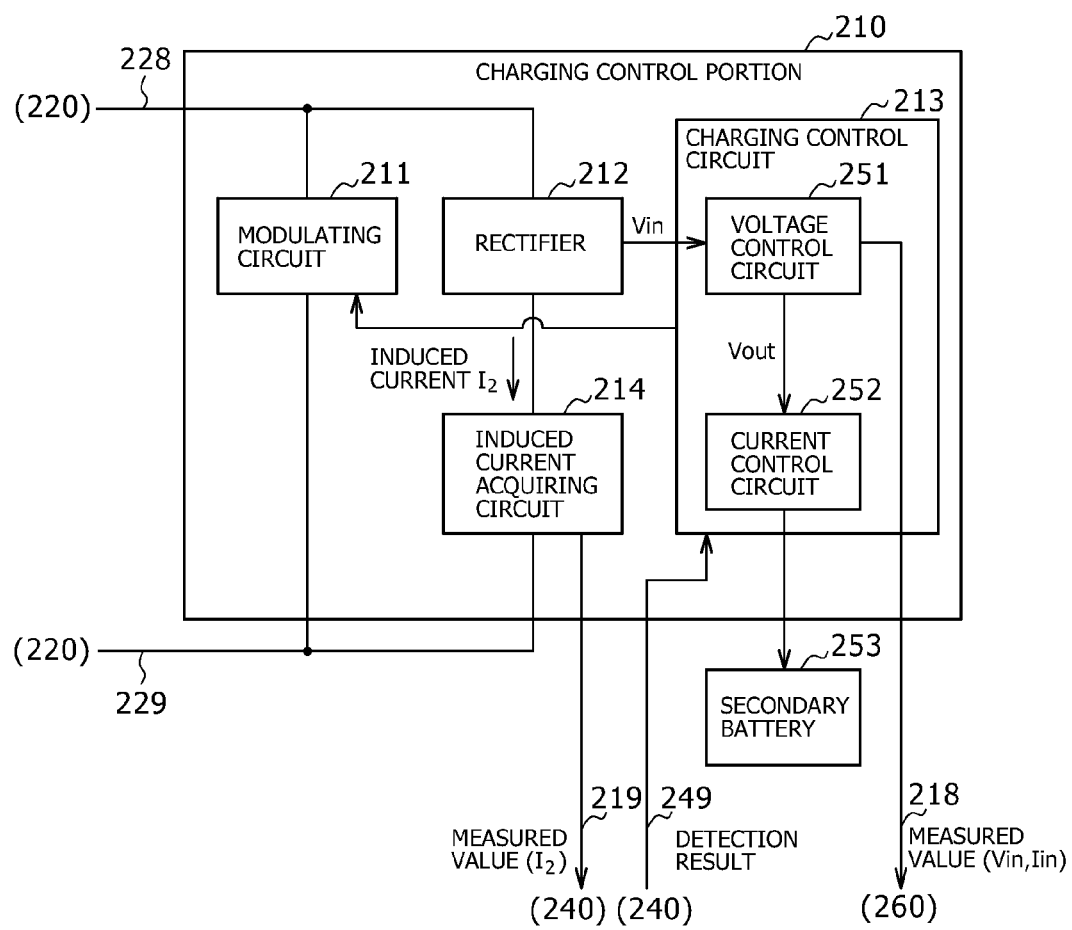
FIG. 22 is a block diagram showing a configuration of a charging control portion in the non-contact type electric power feeding system according to the fourth embodiment of the present disclosure.

FIG. 22 is a block diagram showing a configuration of the changing control portion 210 in the non-contact electric power feeding system according to the fourth embodiment of the present disclosure. A changing control circuit 213 in the fourth embodiment of the present disclosure includes a voltage control circuit 251 and a current control circuit 252. In addition, a secondary battery 253 is connected to the changing control circuit 213.

The voltage control circuit 251, for example, controls a D.C. voltage by using a series regulator or the like for controlling an output voltage at a given value. In addition, the voltage control circuit 251, for example, measures a voltage and a current between input terminals of the series regulator in the form of the input voltage Vin and the input current Iin, respectively, and outputs the measured values of the voltage and the current across the input terminals of the series regulator to the electromotive force ratio acquiring portion 260. The current control circuit 252 supplies the electric power to the secondary battery 253 to charge the secondary battery 253 with the electricity, and also controls the charging current. The charging current is controlled so as to correspond to the characteristics, the charging time, and the like of the secondary battery 253. The secondary battery 253 accumulates therein the electric power supplied thereto from the current control circuit 252.

It is noted that for the purpose of measuring plural input voltages Vin different in value from one another and plural input currents Iin different in value from one another, the modularizing circuit 211 may output a control signal in accordance with which an amount of supplied electric power is changed to the modularizing circuit 211 in a phase of the measurement of the electromotive force ratio k. As a result, the plural input voltages Vin, and the plural input currents Iin are efficiently measured.

Figure 23:
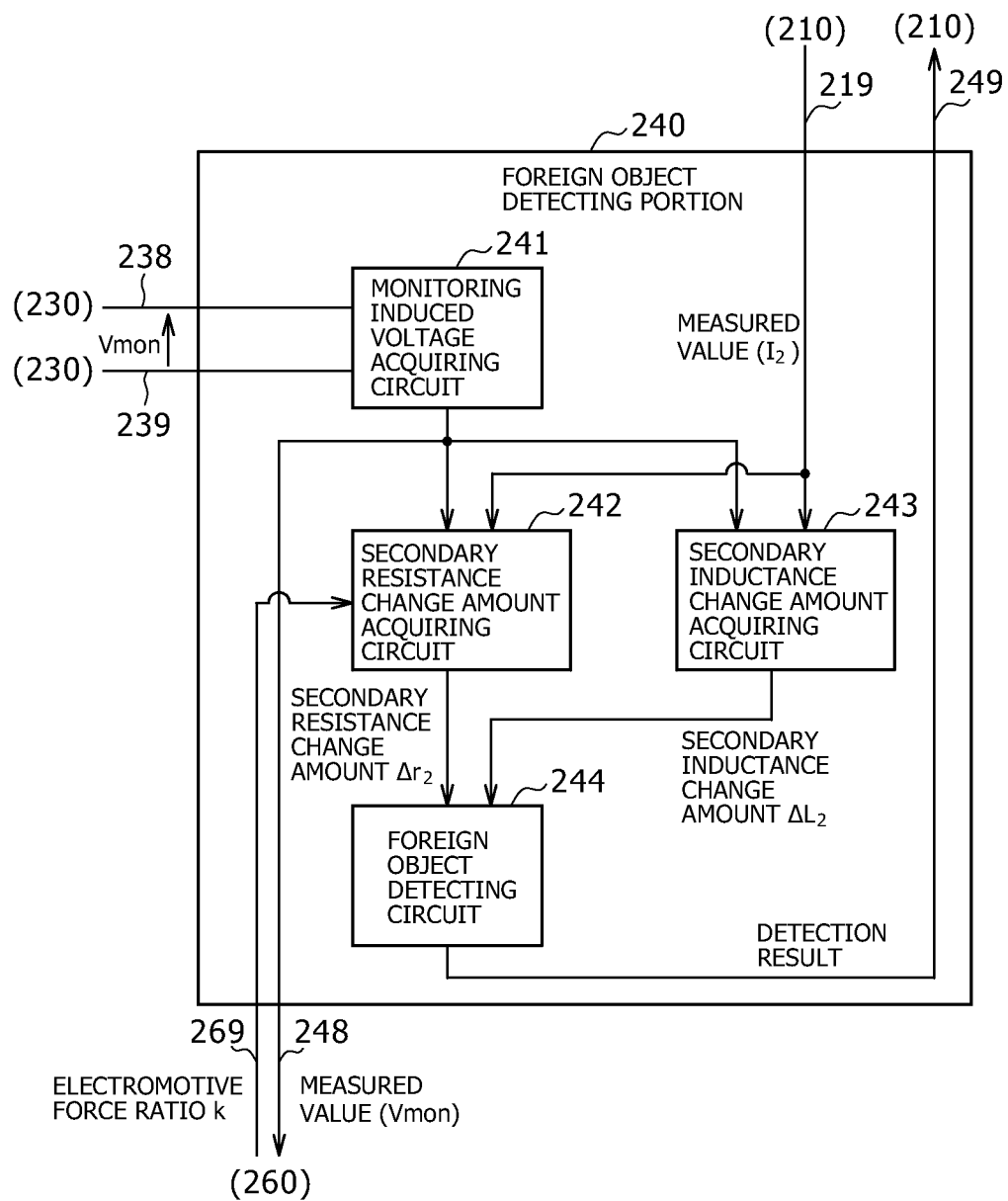
FIG. 23 is a block diagram showing a configuration of a foreign object detecting portion in the non-contact type electric power feeding system according to the fourth embodiment of the present disclosure.

FIG. 23 is a block diagram showing a configuration of a foreign object detecting portion 240 in the non-contact electric power feeding system according to the fourth embodiment of the present disclosure. A monitoring induced voltage acquiring portion 241 in the fourth embodiment outputs a measured value of the monitoring induced voltage Vmon to the electromotive force ratio acquiring portion 260. In addition, the secondary resistance change amount acquiring circuit 242 in the fourth embodiment stores therein the electromotive force ratio k acquired from the electromotive force ratio acquiring portion 260, and acquires the secondary resistance change amount $\Delta r_2$ by using the electromotive force ratio k.

[Configuration of Electromotive Force Ratio Acquiring Portion]

Figure 24:
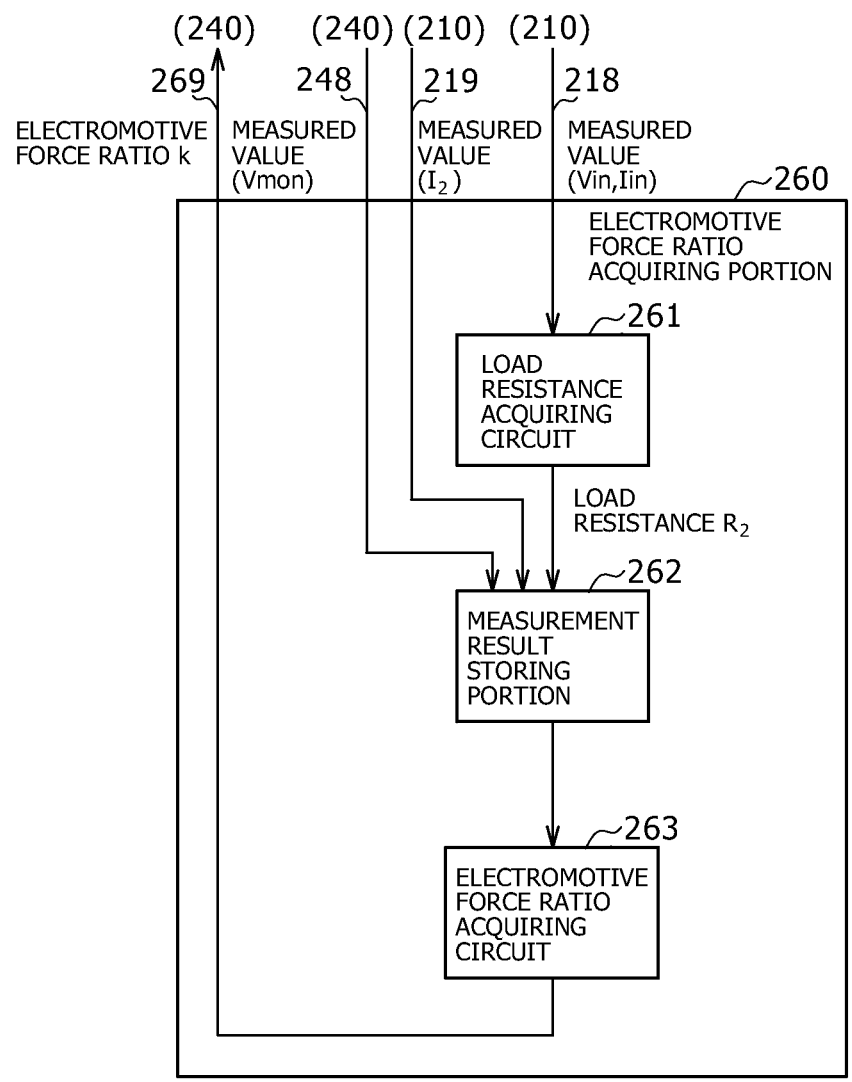
FIG. 24 is a block diagram showing a configuration of an electromotive force ratio acquiring portion in the non-contact type electric power feeding system according to the fourth embodiment of the present disclosure.

FIG. 24 is a block diagram showing a configuration of an electromotive force ratio acquiring portion 260 in the non-contact electric power feeding system according to the fourth embodiment of the present disclosure. The electromotive force ratio acquiring portion 260 includes a load resistance acquiring circuit 261, a measurement result storing portion 262, and an electromotive force ratio acquiring circuit 263.

The load resistance acquiring circuit 261 acquires a load resistance $R_2$. The load resistance acquiring circuit 261 receives both of the input voltage Vin and the input current Iin from the charging control portion 210. Also, the load resistance acquiring circuit 261 calculates a resistance of the series regulator from the output voltage Vout, from the series regulator, which is previously acquired, and the input voltage Vin and the input current Iin. The load resistance acquiring circuit 261 adds the resistance of the series regulator, and a resistance, of a load other than the series regulator, which is previously acquired to each other, thereby calculating the load resistance $R_2$ of the entire load. The load resistance acquiring circuit 261 preserves the load resistance $R_2$ thus calculates in the measurement result storing portion 262.

The measurement result storing portion 262 stores therein plural sets of measured values each composed of the monitoring induced voltage Vmon, the secondary current $I_2$, and the load resistance $R_2$. The electromotive force ratio acquiring circuit 263 acquires the electromotive force ratio k from the plural sets of measured values, and Expression (15). The electromotive force ratio acquiring circuit 263 outputs the electromotive force ratio k thus calculated to the secondary resistance change amount acquiring circuit 242 in the foreign object detecting portion 240.

It is noted that although the electromotive force ratio acquiring portion 260 is configured in such a way that plural load resistances $R_2$ are acquired from plural input voltages Vin and plural input currents Iin, the present disclosure is by no means limited to this configuration as long as the plural load resistances $R_2$ can be acquired. For example, a connection control portion for carrying out the control in accordance with which a load is added and connected to the charging control portion 210 may be further provided in the electric power receiving apparatus 200 in the fourth embodiment of the present disclosure. With this configuration, when the measurement of the electromotive force ratio k is instructed to be started by a manipulation or the like made by a worker, the connection control portion connects the load either in series with or in parallel with the charging control portion 210, and outputs a signal with which the electromotive force ratio acquiring portion 260 is to be informed of the effect that the load has been connected to the charging control portion 210 to the electromotive force ratio acquiring portion 260. The load resistances $R_2$ before and after the connection, and the monitoring induced voltage Vmon and the secondary current $I_2$ before the connection are previously stored in the measurement result storing portion 262. After reception of the notice of the effect that the load has been connected to the charging control portion 210, the electromotive force ratio acquiring portion 260 acquires the monitoring induced voltage Vmon and the secondary current $I_2$ after the connection, and calculates the electromotive force ratio k from the monitoring induced voltages Vmon, and the secondary currents $I_2$, and the load resistances $R_2$ before and after the connection.

Figure 25:
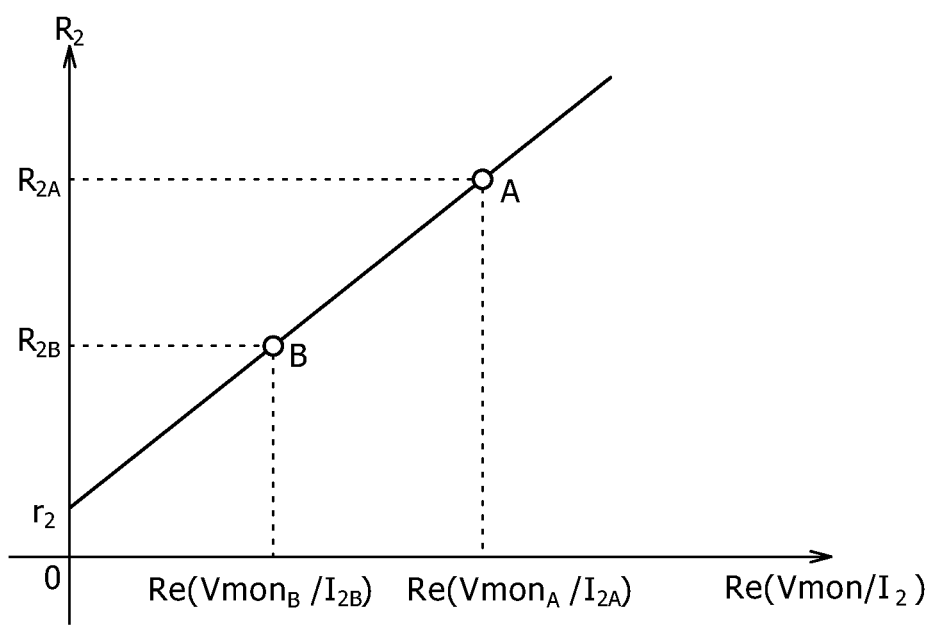
FIG. 25 is a graphical representation showing a relationship between a monitoring induced voltage and an induced current, and a secondary resistance in the non-contact type electric power feeding system according to the fourth embodiment of the present disclosure.

FIG. 25 is a graphical representation showing an example of a relationship between the monitoring induced voltage Vmon and the induced current $I_2$, and the load resistance $R_2$ in the non-contact electric power feeding system according to the fourth embodiment of the present disclosure. In FIG. 25, an axis of ordinate represents "$R_2$," and an axis of abscissa represents "$Re(Vmon/I_2)$." A point A is a measured point which is plotted based on $R_{2A}$, $Vmon_A$, and $I_{2A}$ which were all measured with a received electric power $W_A$. Also, a point B is a measured point which is plotted based on $R_{2B}$, $Vmon_B$, and $I_{2B}$ with a received electric power $W_B$. A gradient of a straight line connecting the points A and B corresponds to the electromotive force ratio k in Expression (15). In addition, an intercept of the straight line corresponds to the secondary resistance $r_2$. It is noted that since a measurement error is generated in some cases, the electromotive force ratio k may be obtained by using the least-square method. In this case, the least-square method is such that the electromotive force ratio k is obtained at which the sum E of squares of a difference $d_x$ between $R_{2X}$ obtained from the measurement points, and $R_{2X}'$ obtained from $Vmon_x$, an $I_{2X}$ of the measurement points by using Expression (15) becomes minimum.

As has been described, according to the fourth embodiment of the present disclosure, the electric power receiving apparatus 200 in the non-contact type electric power feeding system of the fourth embodiment can acquire the precise value of the electromotive force ratio k from the monitoring induced voltage Vmon, the secondary current $I_2$, and the load resistance $R_2$. As a result, the foreign object is precisely detected.

5. Fifth Embodiment

[Configuration of Foreign Object Detecting Portion]

Figure 26:
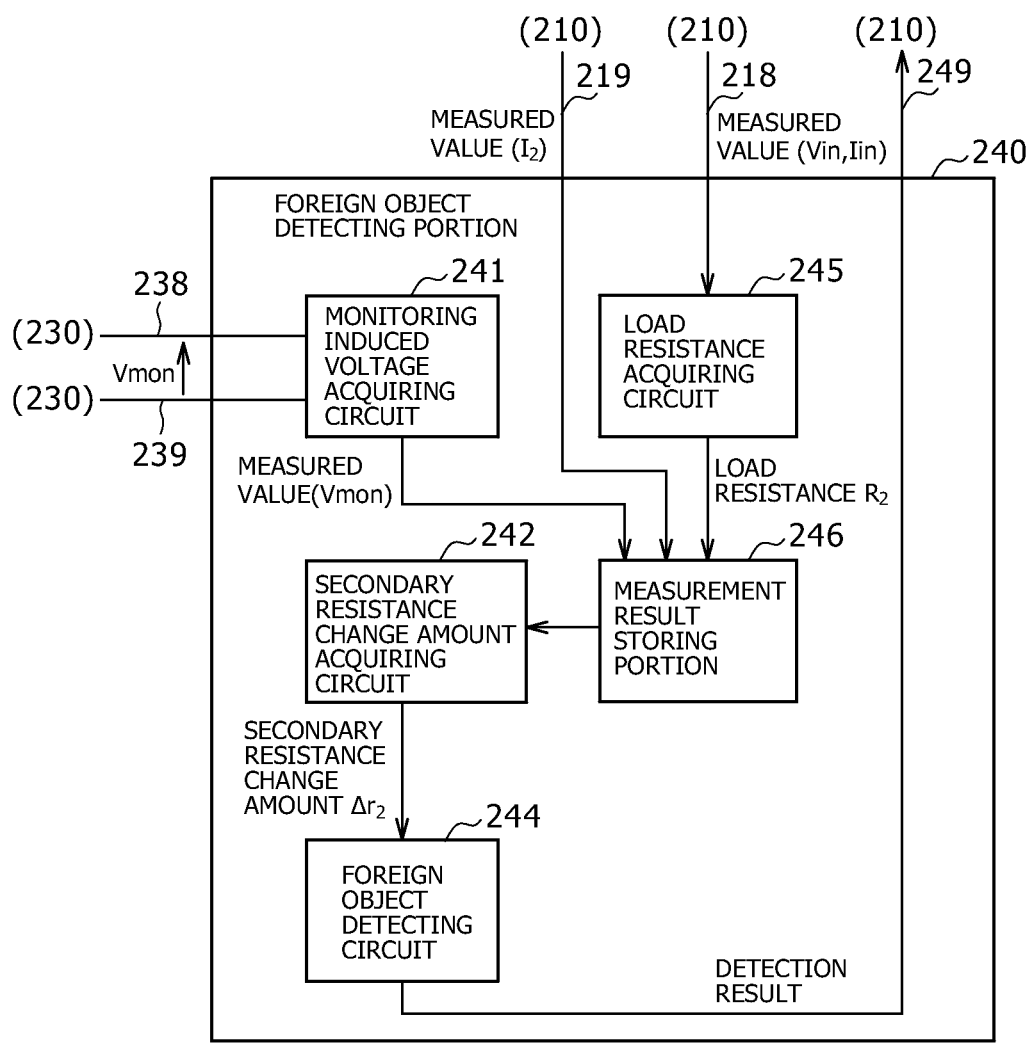
FIG. 26 is a block diagram showing a configuration of a foreign object detecting portion in a non-contact type electric power feeding system as an electric power feeding system according to a fifth embodiment of the present disclosure.

FIG. 26 is a block diagram showing a configuration of a foreign object detecting portion 240 in a non-contact electric power feeding system according to a fifth embodiment of the present disclosure. In the non-contact electric power feeding system of the fourth embodiment, the foreign object detecting portion 240 calculates the impedance on the assumption that the electromotive force ratio k is constant. However, as described in the fourth embodiment, the electromotive force ratio k is not necessarily constant. The foreign object detecting portion 240 in the fifth embodiment is different from that in the first embodiment in that the secondary resistance change amount $\Delta r_2$ is calculated without using the electromotive force ratio k. A changing control portion 210 in the fifth embodiment has the same configuration as that in the changing control portion 210 in the fourth embodiment, and thus measures both of the input voltage Vin and the input current Iin during the charging and outputs the measured values of the input voltage Vin and the input current Iin to the foreign object detecting portion 240. In addition, the foreign object detecting portion 240 in the fifth embodiment is different from the foreign object detecting portion 240 in the first embodiment in that the foreign object detecting portion 240 includes a load resistance acquiring circuit 245 and a measurement result storing portion 246, and does not include the secondary inductance change amount acquiring circuit 243.

It is noted that for the purpose of measuring plural input voltages Vin different in value from one another and plural input currents Iin different in value from one another, the changing control portion 210 in the fifth embodiment may transmit a control signal in accordance with which an amount of supplied electric power is requested to be changed to the electric power feeding circuit 100 during the changing. As a result, the plural input voltages Vin, and the plural input currents Iin are efficiently measured.

A configuration of the load resistance acquiring circuit 245 is the same as that of the load resistance acquiring circuit 261 in the fourth embodiment. In addition, a configuration of the measurement result storing portion 246 is the same as that of the measurement result storing portion 262 in the fourth embodiment. The secondary resistance change amount acquiring circuit 242 in the fifth embodiment obtains the secondary resistance change amount $\Delta r_2$ from the measurement results. As described with reference to FIG. 20, at least two sets of measurement results are substituted into Expression (15), whereby the secondary resistance $r_2$ can be obtained even if the electromotive force ratio k is unclear. Specifically, the intercept of the straight line exemplified in FIG. 23 is equal to the secondary resistance $r_2$. The secondary resistance change amount acquiring circuit 242 calculates the secondary resistance change amount $\Delta r_2$ from the resulting secondary resistance $r_2$ by using Expression (3), and outputs the secondary resistance change amount $\Delta r_2$ thus calculated to the foreign object detecting circuit 244.

As has been described, according to the fifth embodiment of the present disclosure, the electric power receiving apparatus 200 in the non-contact type electric power feeding system of the fifth embodiment can acquire the precise amount of change in the impedance from the monitoring induced voltage Vmon, the secondary current $I_2$, and the load resistance $R_2$. As a result, even when the value of the electromotive force ratio k is changed, the foreign object can be precisely detected.

It is noted that the embodiments described above show an example for embodying the present disclosure, and thus the matters in the embodiments described above, and the invention identifying matters in the appended claims have correspondence relationships. Likewise, the invention identifying matters in the appended claims, and the matters, in the embodiments described above of the present disclosure, designated by the same names as those in the invention identifying matters in the appended claims have correspondence relationships. However, the present disclosure is by no means limited to the embodiments described above, and thus can be embodied by making various kinds of modified changes in the embodiments described above without departing from the subject matter of the present disclosure.

In addition, the processing procedures explained in the embodiments described above may be grasped as a method having these series of procedures, and may also be grasped as a program in accordance with which a computer is caused to execute these series of procedures, or a recording medium for storing therein the program. A Compact Disk (CD), a MiniDisc (MD), a Digital Versatile Disk (DVD), a memory card, a Blu-ray Disk (registered trademark), and the like can be used as this recording medium.

It is noted that the present disclosure can also adopt the following constitutions.

(1) An electric power receiving apparatus including:

an electric power receiving coil disposed in a position where a receiving voltage is induced by a magnetic field from an electric power feeding apparatus;

a measuring coil disposed in a position where a monitoring induced voltage as a voltage corresponding to the receiving voltage is induced by the magnetic field; and a foreign object detecting portion generating an amount of change in an impedance of the electric power receiving coil from the monitoring induced voltage and an induced current of the electric power receiving coil, thereby detecting a foreign object in the magnetic field based on the amount of change.

(2) The electric power receiving apparatus described in the paragraph (1), in which the measuring coil is disposed in a position where a mutual induced voltage as a voltage induced in the measuring coil by the magnetic field from the electric power receiving coil becomes smaller than a predetermined value.

(3) The electric power receiving apparatus described in the paragraph (2), in which the measuring coil is disposed in a position where the measuring coil straddles a part of the electric power receiving coil.

(4) The electric power receiving apparatus described in the paragraph (2), in which an area of a coil surface of the measuring coil is smaller than that of the electric power receiving coil, and the measuring coil is disposed at a center of the electric power receiving coil.

(5) The electric power receiving apparatus described in any one of the paragraphs (1) to (4), in which the impedance includes at least one of a resistance and a reactance of the electric power receiving coil.

(6) The electric power receiving apparatus described in any one of the paragraphs (1) to (5), in which the foreign object detecting portion determines that the foreign object is present when the amount of change exceeds a predetermined threshold value.

(7) The electric power receiving apparatus described in any one of the paragraphs (1) to (6), in which the impedance includes a resistance of the electric power receiving coil, and the foreign object detecting portion determines that the foreign object is present when an eddy current loss of the foreign object is generated from an amount of change in the resistance, and the induced current and exceeds a threshold value.

(8) The electric power receiving apparatus described in any one of the paragraphs (1) to (7), further including:
a control signal transmitting circuit transmitting a control signal in accordance with which a power source supplied from the electric power feeding apparatus through the magnetic field is controlled to the electric power feeding apparatus when in the detection of the foreign object, the foreign object is determined to be present.

(9) The electric power receiving apparatus described in the paragraph (8), in which the foreign object detecting portion determines an amount of control for the power source based on the amount of change, and the induced current when in the detection of the foreign object, the foreign object is determined to be present; and
the control signal transmitting circuit transmits the control signal in accordance with which the power source is controlled so as to correspond to the amount of control.

(10) The electric power receiving apparatus described in any one of the paragraphs (1) to (9), further including:
a charging control circuit controlling a charging current to a load connected to the electric power receiving apparatus based on a result of the detection of the foreign object.

(11) The electric power receiving apparatus described in the paragraph (10), further including:
a control result transmitting circuit transmitting a result of the control for the charging current to the electric power feeding apparatus.

(12) The electric power receiving apparatus described in any one of the paragraphs (1) to (11), further including:
a ratio generating portion generating a ratio between the receiving voltage and the monitoring induced voltage,
in which the foreign object detecting portion generates the amount of change based on the ratio thus acquired, the monitoring induced voltage, and the induced current.

(13) The electric power receiving apparatus described in any one of the paragraphs (1) to (12), in which the foreign object detecting portion further acquires a resistance of the electric power receiving coil when the foreign object is absent as a secondary resistance, and generates the amount of change from the secondary resistance, the monitoring induced voltage, and the induced current.

(14) A method of controlling an electric power receiving apparatus including:
generating an amount of change in an impedance of an electric power receiving coil from a monitoring induced voltage in a measuring coil disposed in a position where the monitoring induced voltage as a voltage corresponding to a receiving voltage is induced by a magnetic field, and an induced current of a receiving coil disposed in a position where the receiving voltage is induced by a magnetic field from an electric power feeding apparatus by a foreign object detecting portion; and
detecting a foreign object in the magnetic field based on the amount of change by the foreign object detecting portion.

(15) An electric power feeding system including:
an electric power feeding apparatus supplying a power source through a magnetic field; and
an electric power receiving apparatus including
an electric power receiving coil disposed in a position where a receiving voltage is induced by the magnetic field,
a measuring coil disposed in a position where a monitoring induced voltage as a voltage corresponding to the receiving voltage is induced by the magnetic field, and
a foreign object detecting portion generating an amount of change in an impedance of the electric power receiving coil from the monitoring induced voltage and an induced current of the electric power receiving coil, thereby detecting a foreign object in the magnetic field based on the amount of change.

The present application contains subject matter related to that disclosed in Japanese Priority Patent Application JP 2012-089054 filed in the Japan Patent Office on Apr. 10, 2012, the entire content of which is hereby incorporated by reference.

What is claimed is:
1. An electric power receiving apparatus, comprising:
an electric power receiving coil disposed in a position where a receiving voltage is induced by a magnetic field from an electric power feeding apparatus;
a measuring coil disposed in a position where a monitoring induced voltage as a voltage corresponding to the receiving voltage is induced by the magnetic field; and
a foreign object detecting portion generating an amount of change in an impedance of said electric power receiving coil from the monitoring induced voltage induced in the measuring coil and an induced current of said electric power receiving coil, thereby detecting a foreign object in the magnetic field based on the amount of change.

2. The electric power receiving apparatus according to claim 1, wherein said measuring coil is disposed in a position where a mutual induced voltage as a voltage induced in said measuring coil by the magnetic field from said electric power receiving coil becomes smaller than a predetermined value.

3. The electric power receiving apparatus according to claim 2, wherein said measuring coil is disposed in a position where said measuring coil straddles a part of said electric power receiving coil.

4. The electric power receiving apparatus according to claim 2, wherein an area of a coil surface of said measuring coil is smaller than an area of a coil surface of said electric power receiving coil, and said measuring coil is disposed at a center of said electric power receiving coil.

5. The electric power receiving apparatus according to claim 1, wherein the impedance includes at least one of a resistance and a reactance of said electric power receiving coil.

6. The electric power receiving apparatus according to claim 1, wherein said foreign object detecting portion determines that said foreign object is present in an event the amount of change exceeds a predetermined threshold value.

7. The electric power receiving apparatus according to claim 1, wherein the impedance includes a resistance of said electric power receiving coil, and said foreign object detecting portion determines that said foreign object is present when an eddy current loss of said foreign object, generated from an amount of change in the resistance and the induced current, exceeds a threshold value.

8. The electric power receiving apparatus according to claim 1, further comprising:
a control signal transmitting circuit transmitting a control signal in accordance with which a power source supplied from said electric power feeding apparatus through the magnetic field is controlled to said electric power feeding apparatus in an event said foreign object is determined to be present.

9. The electric power receiving apparatus according to claim 8, wherein said foreign object detecting portion determines an amount of control for said power source based on the amount of change, and the induced current in an event said foreign object is determined to be present; and
said control signal transmitting circuit transmits the control signal in accordance with which said power source is controlled so as to correspond to the amount of control.

10. The electric power receiving apparatus according to claim 1, further comprising:
a charging control circuit controlling a charging current to a load connected to said electric power receiving apparatus based on a result of the detection of said foreign object.

11. The electric power receiving apparatus according to claim 10, further comprising:
a control result transmitting circuit transmitting a result of the control for the charging current to said electric power feeding apparatus.

12. The electric power receiving apparatus according to claim 1, further comprising:
a ratio generating portion generating a ratio between the receiving voltage and the monitoring induced voltage,
wherein said foreign object detecting portion generates the amount of change based on the ratio thus acquired, the monitoring induced voltage, and the induced current.

13. The electric power receiving apparatus according to claim 1, wherein said foreign object detecting portion further acquires a resistance of said electric power receiving coil in an event said foreign object is absent as a secondary resistance, and generates the amount of change from the secondary resistance, the monitoring induced voltage, and the induced current.

14. A method of controlling an electric power receiving apparatus, comprising:
generating, by a foreign object detecting portion, an amount of change in an impedance of an electric power receiving coil from a monitoring induced voltage in a measuring coil disposed in a position where the monitoring induced voltage as a voltage corresponding to a receiving voltage is induced by a magnetic field, and an induced current of said electric power receiving coil disposed in a position where the receiving voltage is induced by the magnetic field from an electric power feeding apparatus; and
detecting a foreign object in the magnetic field based on the amount of change by said foreign object detecting portion.

15. An electric power feeding system, comprising:
an electric power feeding apparatus supplying a power source through a magnetic field; and
an electric power receiving apparatus including:
an electric power receiving coil disposed in a position where a receiving voltage is induced by the magnetic field,
a measuring coil disposed in a position where a monitoring induced voltage as a voltage corresponding to the receiving voltage is induced by the magnetic field, and
a foreign object detecting portion generating an amount of change in an impedance of said electric power receiving coil from the monitoring induced voltage induced in the measuring coil and an induced current of said electric power receiving coil, thereby detecting a foreign object in the magnetic field based on the amount of change.

* * * * *